US009834130B1

(12) United States Patent
Peters

(10) Patent No.: US 9,834,130 B1
(45) Date of Patent: Dec. 5, 2017

(54) QUICK-RELEASE LOGISTIC TRACK FOR SECURING CARGO

(71) Applicant: Daniel Peters, Lafayette, IN (US)

(72) Inventor: Daniel Peters, Lafayette, IN (US)

( * ) Notice: Subject to any disclaimer, the term of this patent is extended or adjusted under 35 U.S.C. 154(b) by 68 days.

(21) Appl. No.: 14/799,219

(22) Filed: Jul. 14, 2015

Related U.S. Application Data

(60) Provisional application No. 62/024,027, filed on Jul. 14, 2014.

(51) Int. Cl.
*B60P 7/15* (2006.01)

(52) U.S. Cl.
CPC ...................... *B60P 7/15* (2013.01)

(58) Field of Classification Search
CPC ..... B60P 7/0807; B60P 7/0823; B60P 7/0815; B60P 3/07; B60P 3/40; B60P 7/06;
(Continued)

(56) References Cited

U.S. PATENT DOCUMENTS

| | | | | |
|---|---|---|---|---|
| 4,168,667 A | * | 9/1979 | Loomis | B60P 7/14 410/118 |
| 5,516,246 A | * | 5/1996 | Helton | B60P 7/08 410/101 |

(Continued)

*Primary Examiner* — Glenn Dayoan
*Assistant Examiner* — Sunsurraye Westbrook

(57) ABSTRACT

A quick-release logistic track having a coupling device and logistic track that creates a sidewall flush-mounted logistic track that allows for continuous cargo tie down points, working in conjunction with primarily vertical slotted posts, that can be placed at any location in the cargo area of a semi-trailer and other cargo transporting vehicles' enabling cargo restraint devices to be placed directly against cargo regardless of where the cargo is positioned. Assembled, the coupling and its logistic track becomes a removable and repositionable horizontal assembly that lays flush against the sidewall and ties together, with two inch centered logistic slots, two permanently mounted vertical logistic posts located on the same sidewall. The horizontal assembly has two integral couplings that can recess and lock into one slot on each of any two permanently mounted vertical logistic posts or that can recess and lock into only one slot on any permanently mounted vertical logistic post and at any height allowing the logistic track to remain flush mount against the sidewall at any point so that the horizontal assembly is positioned between the sidewall and freight. Where the horizontal assembly is locked into one slot on each of any two permanently mounted vertical logistic posts there will be amply room to install the horizontal assembly before the freight is loaded or after the freight is loaded. Where the operator does not have ample room to access a slot on a vertical logistic post, due to freight loaded too close to the sidewall, the operator will place the assembly between the freight and sidewall and only lock one coupling into one slot of an accessible vertical logistic post that is not obstructed by freight; usually located aft of the freight. The coupling and logistic track allow for a maximum of three eights of one inch to one half of one inch intrusion into the interior cargo area while creating slots every two inches between the permanently mounted vertical logistic posts greatly reducing the distance between slots on the permanent vertical logistic posts installed by the manufacturer which typically are spaced at forty eight inches or fifty inches. Often, cargo being transported does not fall directly in front of one of the permanent vertical logistic posts and the closer slot distance created by this invention allows a cargo bar or other cargo restraint devices to be secured in the logistic track at a closer and exact distance to the cargo it is securing and at any height; helping to eliminate any cargo movement that can result in damage to the cargo or damage to the vehicle. The recessed coupling allows for minimal intrusion into the cargo area reducing the ability for the logistic track to cause damage to cargo during its loading or unloading or for the logistic track itself to be damaged. The logistic track creates no real penalty on limiting cargo size width. In addition to allowing for an exact location in securing cargo with cargo (Continued)

restraint devices reducing damage to cargo and equipment, the invention eliminates labor and material costs for installation of other less than ideal permanently mounted solutions on the market as well as reduces weight allowing for increased payload capacity and reduced fuel consumption. The invention may be embodied in a shorter design with one quick-release coupler for attaching the logistic track to only one slot on one vertical logistic post. The inventions most forward coupling can be manually repositioned and placed in any of the pre-punched mounting holes that are pre-punched on two inch centers on the logistic track's top and bottom flanges so that the invention can accommodate any vertical logistic post centers making the invention universal fitting.

5 Claims, 39 Drawing Sheets

(58) Field of Classification Search
CPC ........ B60P 7/0876; B60P 3/20; B61D 45/001; B61D 45/00; B61D 17/08; B61D 17/18; B61D 27/0081; B61D 3/16

USPC .......... 410/89, 143–150, 101, 106, 116, 97; 296/182.1, 186.1, 191, 100.07, 51.1

See application file for complete search history.

(56) References Cited

U.S. PATENT DOCUMENTS

| | | | | |
|---|---|---|---|---|
| 5,807,047 | A * | 9/1998 | Cox | B60P 7/15 410/143 |
| 6,895,867 | B1 * | 5/2005 | Burrows | B60P 1/00 105/375 |
| 7,578,644 | B2 * | 8/2009 | Squyres | B60P 1/00 410/143 |
| 8,028,845 | B2 | 10/2011 | Himes | |
| 8,057,142 | B1 * | 11/2011 | Alamillo | B60P 7/0807 410/101 |
| 8,439,612 | B2 | 5/2013 | Chamoun | |
| 2012/0091087 | A1 | 4/2012 | Hines | |
| 2013/0136556 | A1 | 5/2013 | Bose | |

* cited by examiner

QUICK-RELEASE LOGISTIC TRACK FOR SECURING CARGO

CROSS-REFERENCE TO RELATED APPLICATION

This application claims the benefit of Provisional Patent Application No. 62/024,027, filed Jul. 14, 2014, which application is hereby incorporated by reference along with all references cited therein.

FIELD

This subject matter is in the field of cargo tie down logistic tracks or cargo tie down vertical logistic posts used in the cargo areas of semi-trailers and other cargo transporting vehicle bodies.

BACKGROUND

Industry Definitions:

Slot: A rectangle shaped hole that is punched in a track or vertical post; measuring two and three eights of one inch tall and one half of an inch wide and, when mounted, has a depth of three eighths of one inch.

Logistic: Simply means there is some form of tie down location inside the cargo area of a semi-trailer and other cargo transporting vehicles; usually in the form of vertical posts with slots or horizontal track with slots that cargo securing devices can lock into. Logistic refers to movement and, in this case, with logistic posts or logistic track one can move cargo securing devices to different areas within the cargo area.

Flush Mount: An object that lies flat against a surface.

Horizontal Logistic Track (FIG. 14): A steel track that has holes punched side by side in a perfect row on two inch increments so that cargo securing devices can lock into the holes in order to secure cargo from moving during transit. The holes vary in shape but are mostly a rectangle shape (referred to as a slot) measuring two and three eights of one inch tall and one half of an inch wide. When the track is mounted the holes (slots) only have a depth of three eighths of one inch. The track is permanently mounted at various heights with bucking rivets, huckbolts—monobolts or bolts and nuts and is commonly installed the entire length on each of the vehicle's sidewalls. This track cannot be repositioned once it is installed. It is installed in equal quantities at the factory and in the aftermarket; consisting of similar market share. This is not an integral part of the vehicle's body.

Vertical Logistic Post (FIG. 13): A permanently mounted steel or aluminum upright post (vertical position—floor to ceiling) that has holes punched above one another in a perfect row in two inch to three inch increments so that cargo securing devices can lock into the holes in order to secure cargo from moving during transit. The holes vary in shape but are mostly a rectangle shape (referred to as a slot) measuring two and three eights of one inch tall and one half of an inch wide. On posts, the holes (slots) have a depth that ranges from three eighths of one inch to one and one quarter of one inch. Virtually every semi-trailer has vertical posts and the posts are commonly positioned on forty eight inch or fifty inch centers throughout the sidewalls. The post is an integral part of the sidewall construction and is only installed at the factory. More posts cannot be added in the aftermarket due to cost. If a post does not have holes (slots), it is referred to as a plain post. Holes cannot be added to plain posts due to cost.

Cargo Tie down/Cargo securing device: A device that secures cargo from moving while being transported. On semi-trailers or other enclosed cargo hauling vehicles, bars and straps are commonly used to accomplish this and they usually connect from one sidewall to the other and the device has ends that lock into a slot on a permanently mounted vertical logistic post or horizontal logistic track that is located on each sidewall—ensuring the device remains in place should the cargo shift during transport. The device is place as close to the cargo as possible.

Cargo tie down horizontal and/or vertical logistic tracks and/or vertical logistic posts are commonly installed, permanently, on the interior sidewalls of semi-trailers or other cargo transporting vehicle bodies in order to secure the ends of various cargo tie down devices used to secure cargo from moving. Logistic track is most commonly installed horizontally (FIG. 14); however, the can be placed vertically as well. Throughout this writing the standard horizontal position is referenced. These cannot be repositioned by the operator to obtain closer spacing between logistic slots in order to better secure the cargo should the cargo be positioned in an area that is not near a logistic slot. In certain cases, both horizontal logistic tracks and vertical logistic posts are installed on the interior sidewall to maximize available logistic slot access at any location. The horizontal logistic tracks or vertical logistic posts are located directly across from one another on the opposing sidewall so that cargo restraint devices can be locked into each side in order to secure cargo from moving while it is being transported from its origin to its destination.

Cargo tie down horizontal logistic tracks are commonly known by those in the industry as horizontal E series track (E-track) or horizontal A series track (A-track), but are not limited to these in shape or name; however, these two horizontal logistic tracks are considered the industry standard horizontally mounted logistic tracks used in securing cargo restraint devices such as cargo bars or strap based devices. These tracks perform well in securing cargo at any location from the nose to the rear of the cargo area but do not perform well with cargo that has different heights or needs secured at one location but at various heights. The horizontal logistic tracks are traditionally installed on sidewalls that only have vertical non logistic posts, posts without a logistic slot or called plain posts; however, there continues to be a demand to also install horizontal logistic tracks on sidewalls with vertical logistic posts due to the greater spacing between the posts. The horizontal logistic tracks are permanently mounted with fasteners such as aluminum buck rivets, bolts and nuts or screws, usually on six to eight inch centers depending upon the type of sidewall construction that the horizontal logistic track is being fastened to. The horizontal logistic track is not considered an integral part of the sidewall construction. The horizontal logistic tracks are most commonly mounted horizontally, as denoted in the name, and on each sidewall, full length on the sidewall, from most rear to most front, and are located directly across from one another on each sidewall, running parallel to the floor. The horizontal logistic tracks are mounted at varying heights and measured from floor to centerline of the track when mounting at a specific dimension. There is no standard dimension for a specific height and varies per owner and type of freight being transported. The horizontal logistic tracks are produced in varying lengths such as a one piece full length that measures as long as fifty two feet six inches or in ten feet lengths that are butted together to make a full length piece. Each installer determines which lengths work best for them when installing at the factory or in the aftermarket. Horizontal logistic tracks are most commonly overlaid flush mount on the sidewall but can be recessed depending upon the type of sidewall construction. Both, E series and A series horizontal logistic tracks have slots, that measure one half inch wide by two and three eighths of one inch in height and are punched on two inch centers the full length of each horizontal logistic track to which most all cargo bars and strap restraint devices' locking ends are designed to attach to. The E series horizontal logistic track's slot has rolled sides where as the A series logistic track does not—though each has a universal acceptance of most industry accepted cargo securing device ends. The horizontal logistic tracks can either be installed at the time the semi-trailer or cargo transporting vehicle body is being manufactured or in the aftermarket. Material most commonly used to form the horizontal logistic track is carbon steel but can be made with almost any material known to those in the trade.

When installing horizontal logistic track to secure loads it is difficult to identify the exact height of the cargo that is being transported since semi-trailers and other cargo transporting vehicle bodies go through various transporting applications and as an owner looks for a one size fits all approach to transporting cargo and, of course, the vehicle usually gets sold, traded or leased to a new owner at some point in its life cycle and, in this case, the new owner will more than likely have different needs for cargo that they transport. In many cases, multiple pairs of horizontal logistic track (FIG. 14) have to be permanently installed at various heights to try and accommodate the many variables of cargo heights that may be incurred. This ultimately results in a burden to the owner in both increased costs for installation and increased weights and still does not guarantee that the correct height will be obtained to properly secure certain cargo. The increased weight is a two fold disadvantage to any owner; limiting the amount of product transported and carrying a penalty in increased fuel usage. An equally important burden is installation of horizontal logistic track on the leading sidewall types, Duraplate and composite material. In this case, hundreds of additional holes have to be drilled through the sidewall for permanent mounting which poses potential problems for leaking sidewalls when rain or snow occurs.

Vertical logistic posts are permanently mounted (FIG. 13), floor to ceiling, and are considered an integral part of the sidewall construction that attaches two forty eight inch to forty nine inch wide industry standard panels together and are installed at the time the semi-trailer or cargo transporting vehicle body is manufactured. These vertical logistic posts are commonly installed on forty eight inch or fifty inch centers to match the width of the panels it is attaching together and are commonly attached to the panels with aluminum buck rivets. These posts perform well in securing freight at any height from the floor to the ceiling of the cargo area but do not perform well with cargo that falls short or aft of the post. The vertical logistic post's slots are punched into the post in a vertical pattern, above one another, the entire height of the post, floor to ceiling, compared to the horizontal logistic tracks that have their respective slots punched side by side. The slots measure the same size as E series and A series horizontal logistic track, one half inch wide by two and three eights of one inch in height. Vertical logistic posts are not added to a semi-trailer or cargo transporting vehicle body after the unit is manufactured in an attempt to close the distance of the spacing of its logistic slot. This is due to extensive labor costs associated with the posts installation—only in repair situations would a vertical logistic post be added to replace a damaged post. Material most commonly used to form the logistic post is carbon steel but has also been known to be made of aluminum or other types of metal and composite material. Vertical logistic posts are most commonly formed as a one piece post; however, in certain sidewalls a steel flat plate with punched slots is used as the face of the post—such designs are for the Duraplate or comparable sidewall construction which are commonly on fifty inch centers. Other less common vertical logistic post spacing that is used in the construction of sidewalls is sixteen inch and twenty four inch but these add cost and weight and are not considered a current standard or specification. Note that certain one piece sidewall constructions may use a vertical logistic post that is not considered an integral part of the sidewall—such examples included the Fiberglass Reinforced Panel (FRP), a sidewall construction that has almost become obsolete when making semi-trailers due to its weight and material cost.

Vertical logistic posts (FIG. 13) commonly installed on forty eight inch or fifty inch centers allows for cargo to be secured tightly only if the cargo stops just short of a post on a forty eight inch center (FIG. 11), greatly limiting the ability to secure cargo properly when the cargo is not placed perfectly in line with a slot. Strap style cargo restraint devices may add more flexibility in securing cargo at unfavorable locations in the cargo area; however, if the freight is located less than two inches or so from the sidewall (FIG. 11) a strap cannot be easily secured in a slot that is forward of the freight due to a certain distance between the sidewall and freight being required in order for the hands and arms of an operator to reach between the freight and sidewall to secure the strap's end fitting into a slot and the distance to the next accessible slot may be too far to reach. In this case, the invention allows for a strap style cargo restraint to be installed on the invention prior to it being positioned between the freight and sidewall requiring only one inch or less clearance between the freight and sidewall. Also freight cargo beams are deemed a very common form of freight securing devises and in these cases the cargo would be able to travel as great as approximately forty eight inches before it is stopped by the next cargo beam location if the cargo is placed just aft of a logistics post. Any movement at all in the cargo has many dangers—the product can shift causing body damage to the vehicle, the product can shift causing damage to the cargo itself and in worse case scenarios shifting of cargo can cause a catastrophic failure to the vehicle and or a roll-over incident can occur. Most manufacturers offer closer vertical logistic posts centers as an upgrade to include twelve inch, sixteen inch and twenty four inch vertical logistic post centers but these still do not guarantee that cargo will be placed at the exact location needed to properly secure cargo tightly. In addition, these closer twelve inch, sixteen inch and twenty four inch centered posts add a burden to the owner in both increased installation costs and increased weights. The increased weight is, again, a two fold disadvantage to any owner; limiting the amount of product transported and carrying a penalty in increased fuel usage.

BRIEF SUMMARY OF THE INVENTION

The present invention provides a quick-release logistic track which preferably has a coupling and logistic track, offering continuous cargo tie down points in conjunction with permanent slots.

BRIEF DESCRIPTION OF THE DRAWINGS

FIG. 53 shows the rear end of the quick-release logistic track placed adjacent a desired slot in a vertical logistic post. In FIG. 54, the bottom coupling is inserted and the top coupling is positioned for insertion. In FIG. 55, the rod in the top coupling is retracted using the handle provided and the top coupling is inserted. FIG. 56 shows the installed quick-release logistic track flush against the sidewall, with the top and bottom couplings recessed behind the sidewall surface.

FIG. 57 shows the quick-release logistic track held in a horizontal position ready for installation. FIG. 58 shows the bottom coupling being inserted. FIG. 59 shows the top coupling, with rod retracted, being inserted. FIG. 60 shows the quick-release logistic track installed, flush against the sidewall, with the top and bottom couplings recessed behind the sidewall surface.

DETAILED DESCRIPTION OF PREFERRED EMBODIMENTS

Figure 1:
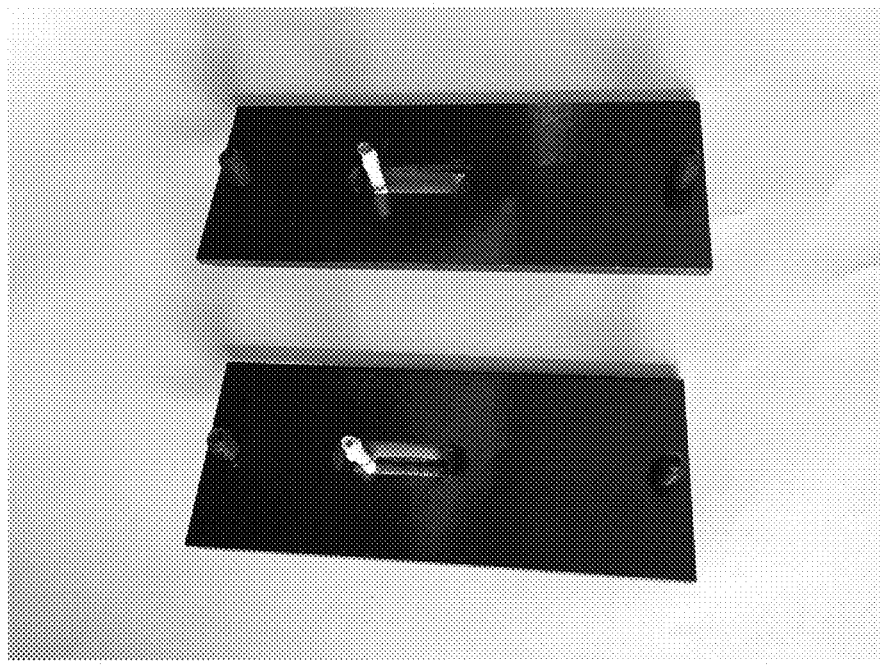
FIG. 1 is a front view of an assembled front and rear coupling prior to installing on logistic track.
Figure 2:
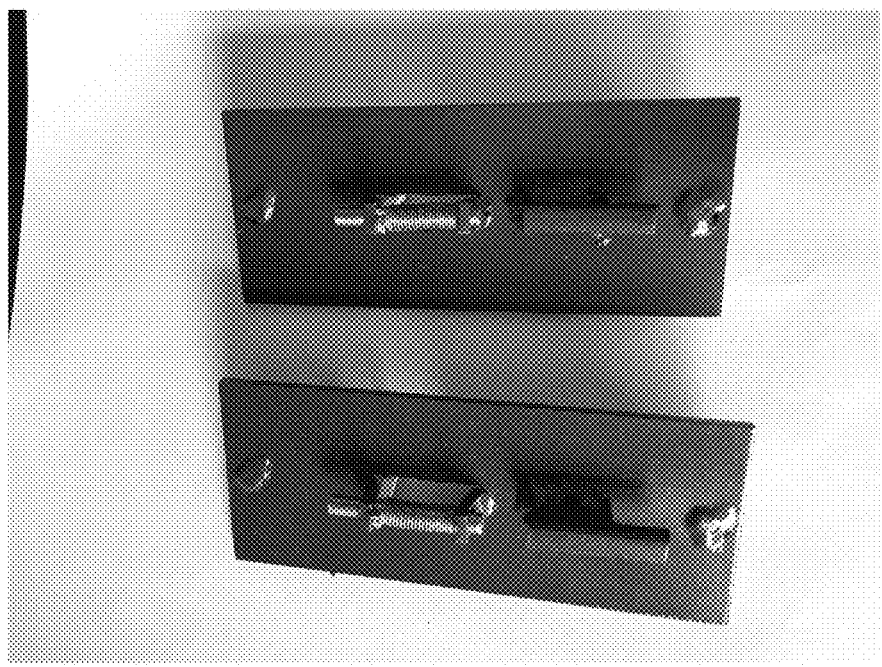
FIG. 2 shows the backside view of an assembled front and rear coupling with the coupling's top and bottom installed.
Figure 3:
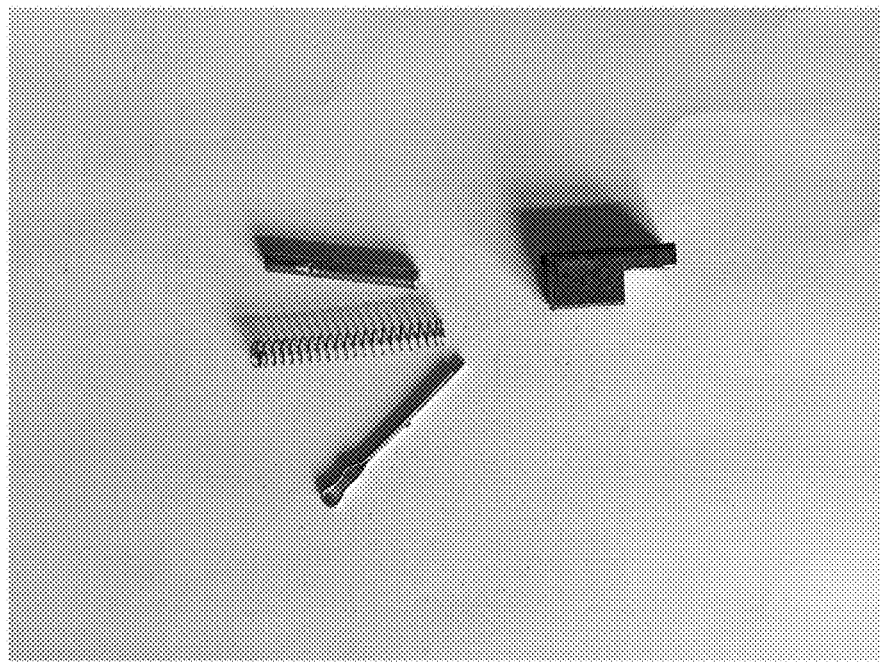
FIG. 3 lists the coupling's individual components required for the coupling assembly; compression spring, pin, handle and bottom.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 4:
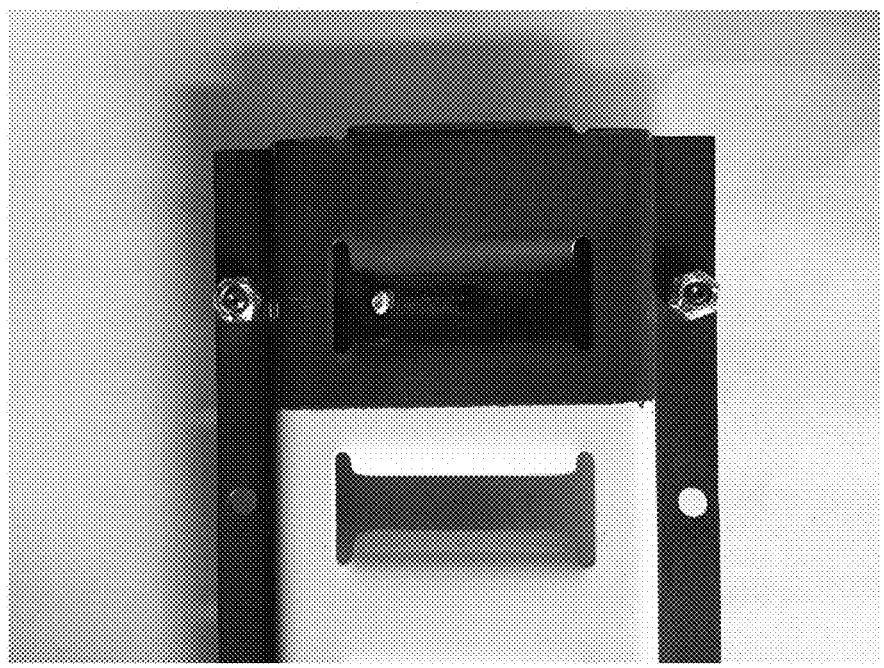
FIG. 4 represents the coupling assembly installed on the logistic track; front view.
Figure 5:
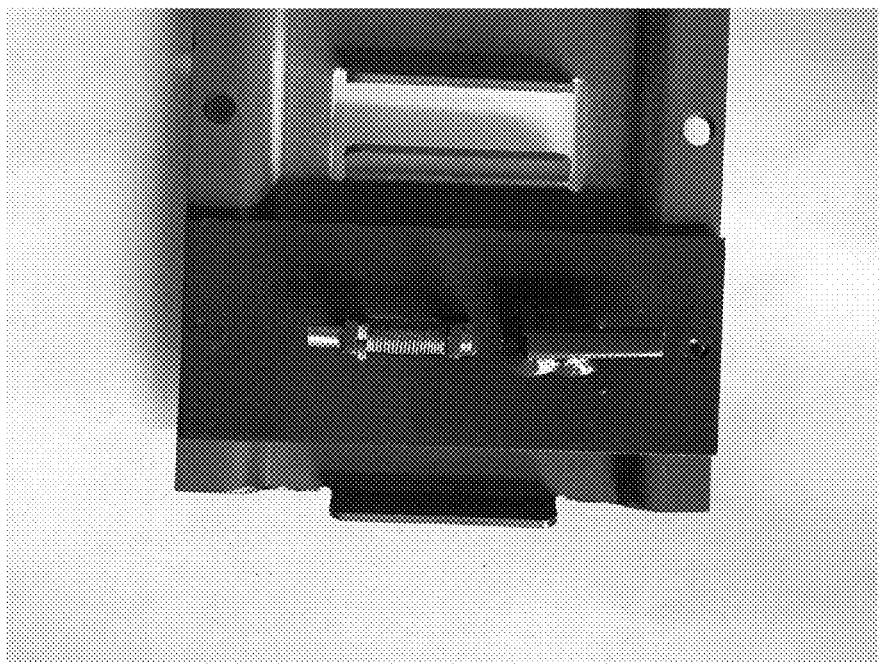
FIG. 5 represents the coupling assembly installed on the logistic track, backside view.
Figure 6:
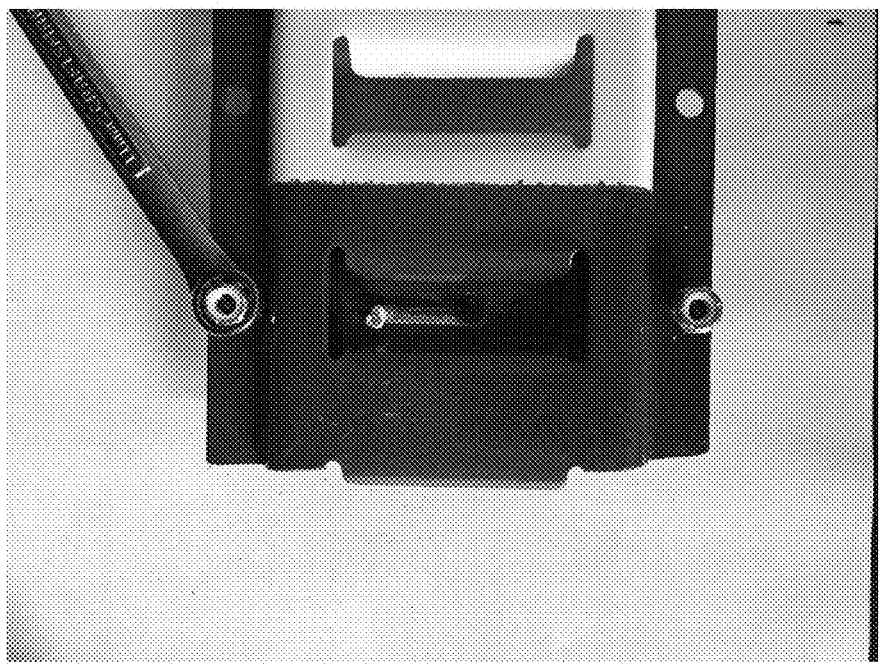
FIGS. 6 and 7 denote the repositioning of a front coupling to accommodate different post centers utilizing pre-punched holes on the logistic track.
Figure 7:
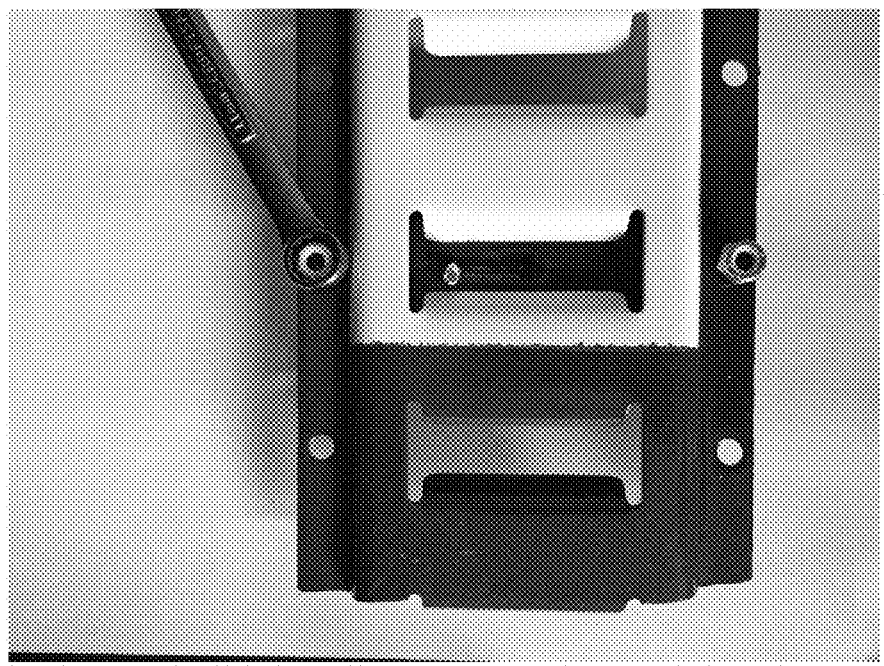
Figure 8:
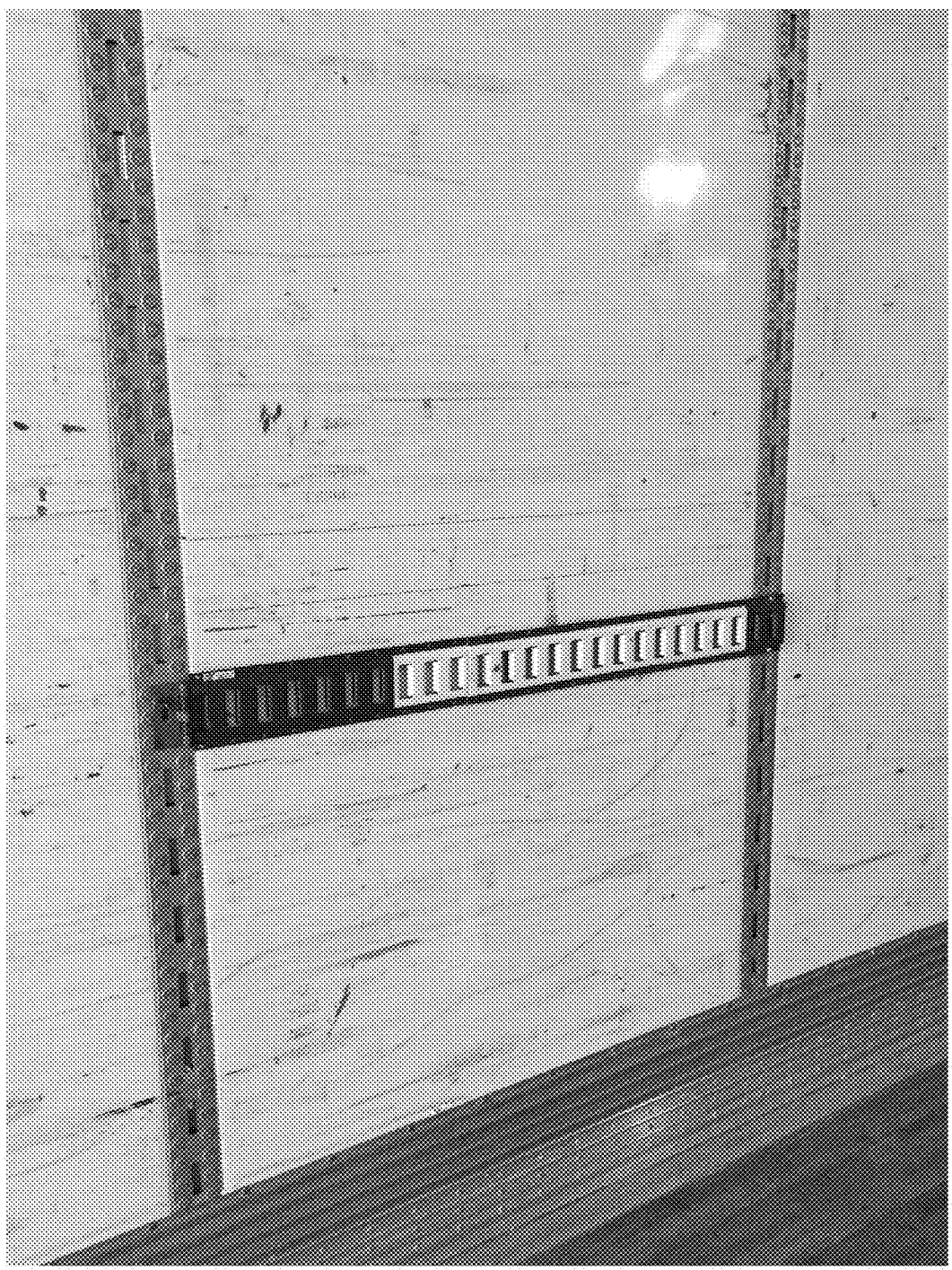
FIG. 8 shows the preferred embodiment stowed on a sidewall of a semi-trailer with 50 inch post centers while locked into one slot on two vertical logistic posts.
Figure 9:
FIG. 9 depicts a cargo beam installed on a quick release logistic track at a random location.
Figure 10:
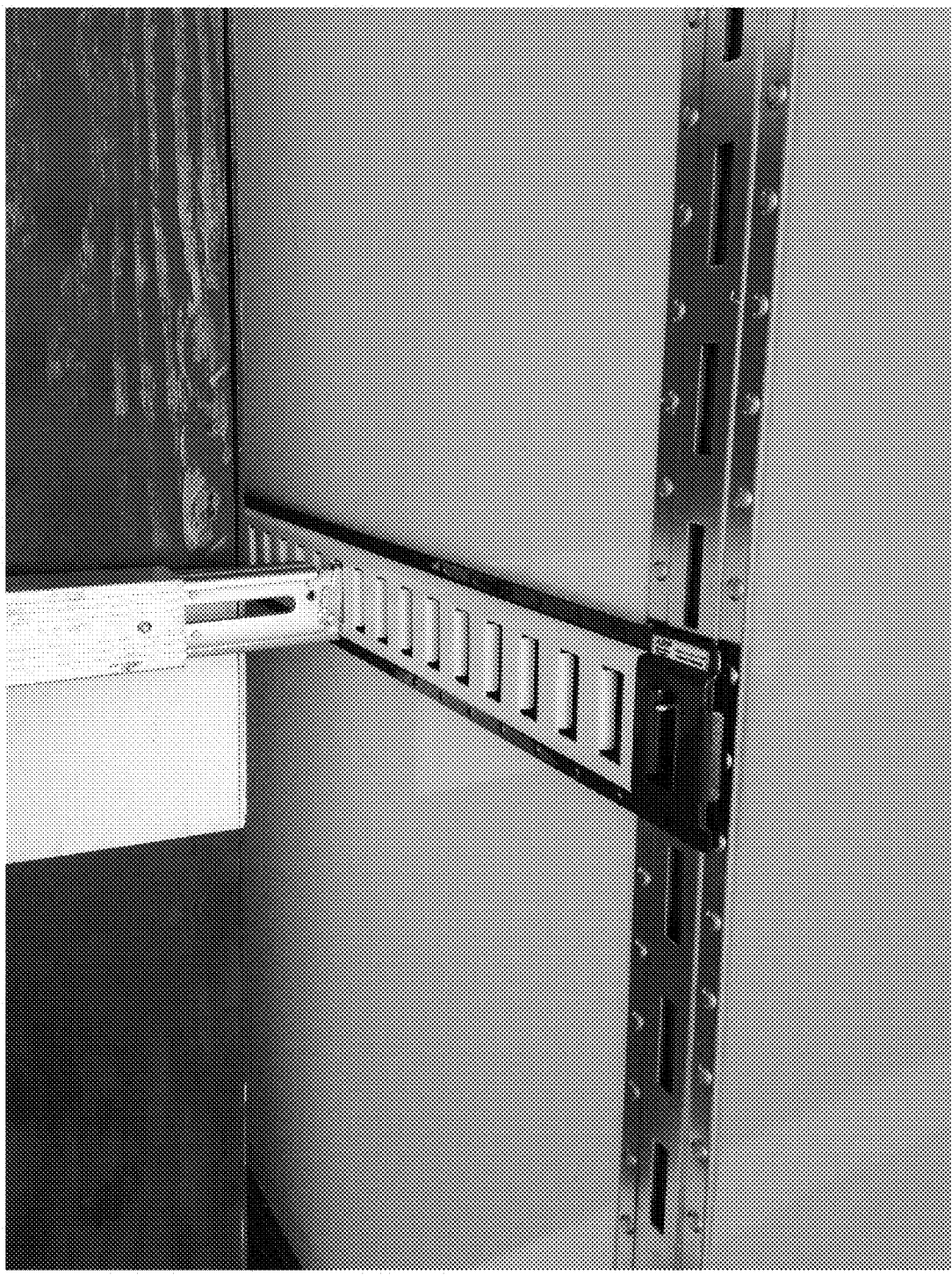
FIG. 10 shows a cargo beam installed directly against the freight using a quick release logistic track
Figure 11:
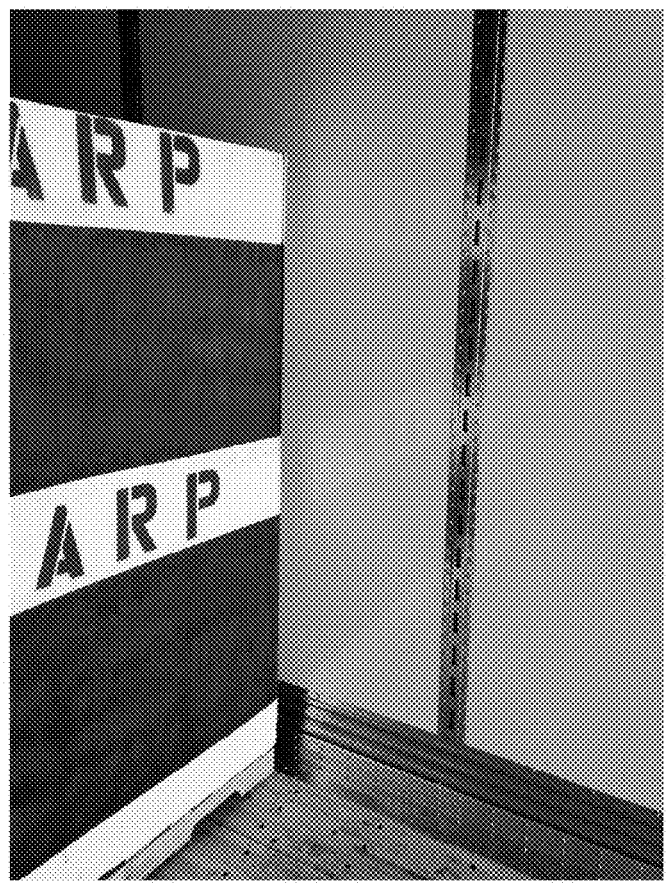
FIG. 11 represents freight that is loaded close to a sidewall and falls between two vertical logistic posts and the difficulty in installing a strap forward of the freight or the extreme distance the freight can travel rearward before reaching the next logistic post.

The preferred embodiment of the present invention comprises (1) Couplings and (2) Logistic Track The couplings are assembled independently (FIG. 1) then attached to each end of the logistic track; by mechanical fasteners (FIG. 4) or welds.

Figure 12:
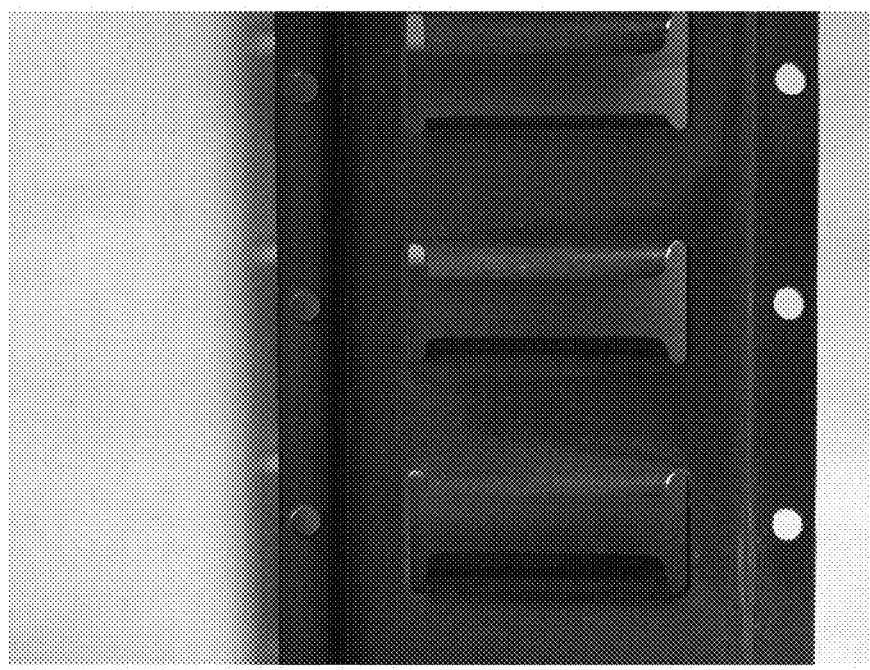
FIG. 12 shows a face section of E-series logistic track.
Figure 13:
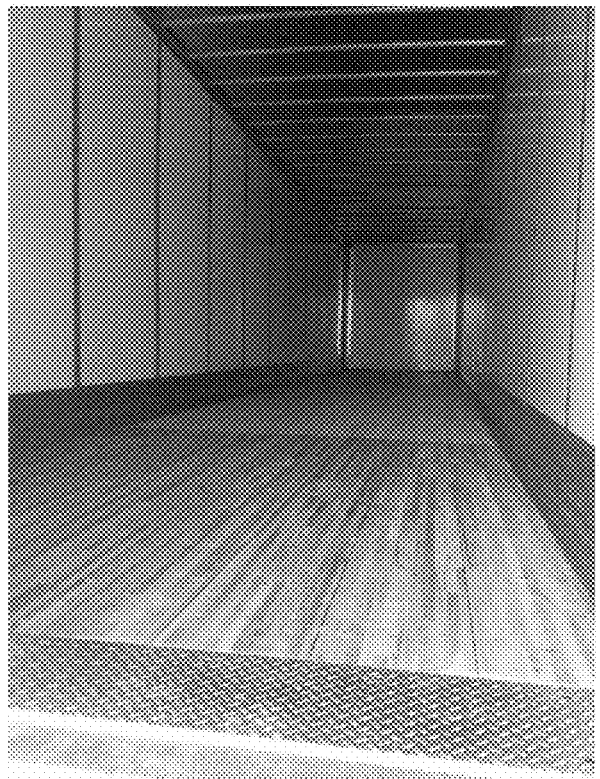
FIG. 13 denotes interior vertical logistic posts on 50 inch centers in a semi-trailer.

The logistic track is a one piece horizontal logistic track called E series track or A series track and is made of carbon steel and is formed in a hat shape with an overall width of five inches and an overall length of twenty four to forty eight inches. The face (FIG. 12) has holes, called slots, punched in a rectangle shape on two inch centers side by side. The slots allow a cargo bar or other cargo securing devices to lock its ends into the one piece horizontal logistic track's slot on each sidewall when securing cargo. The industry standard logistic track has pre-punched mounting holes punched on two inch centers (FIG. 12) for permanent mounting which this embodiment incorporates to make it universal fitting based upon varying vertical logistic post centers. The one piece horizontal logistic track can be made of varying material, can be formed into different shapes using different dimensions and can be made by using two or more short pieces that may slide together or mechanically fasten together and interlock to make one. Slot centers can also be reduced further if found to be necessary but this particular track's shape, dimensions and material type described, herein, to compliment the invention are the most commonly specified and accepted in the industry and offers a low profile design that has minimal intrusion into the cargo area; reducing the track's ability to snag and damage cargo as well as reducing the track's risk of being damaged, itself, by forklift loading/unloading cargo.

Couplings:

The logistic track has two end couplings of the same design (FIG. 1). One end coupling is considered the front and is created to be repositioned and one end coupling is considered the rear and is created to remain fixed. Each end coupling has a top and a bottom formed from or welded to an end plate; the entire assembly is considered the coupling.

The coupling's end plates are carbon steel by one eighth inch thick by two inches wide by four and seven eighths inch long with two ¼ inch mounting holes punched at the top and bottom.

The end plate's ¼ holes are punched approximately ¼ inch down from each end and are centered on the end plate to match mounting holes pre-punched in the logistic track. ¼ inch diameter by ⅝ inch long threaded studs are welded flush on the backside of the end plate and protrude ⅜ inch outward on the front side of the end plate so that the threaded studs can be inserted through any set of pre-punched mounting holes on the logistic track and nutted to secure the coupling assembly to the logistic track. Either coupling can be repositioned but it is preferred that the front end coupling be removed, manually, and repositioned in any other set of logistic track mounting holes to accommodate various vertical logistic post centers making the logistic track assembly universal fitting.

The coupling's top is formed from the end plate material.

The coupling's bottom is fabricated separately and attached to the end plate

The coupling's top and bottom are formed/fabricated and mounted on the backside of the front and rear end plates in symmetrical locations via bending and welding.

The coupling's top is formed from the end plate material via punching and bending resulting in two integral tabs positioned directly above one another and centered width ways on the end plate and that protrude on the backside of the end plate by seven sixteenth inch deep and five sixteenths inch wide with a three sixteenths inch hole punched in each tab. Each tab is three quarters of one inch apart from top to bottom—aligned directly above one another. The coupling's tabs protruded outward on the backside of the front end plate but this will be recessed when placed into a permanent logistic post's slot.

The coupling's bottom is permanently mounted via weld to each of the front and rear end plates and is installed on the backside of each plate directly below the coupling's top tabs. The dimension for placement of the bottom coupling is 2¹¹⁄₁₆ inch from the top of the coupling's top tab to the bottom of the bottom coupling which will ensure a tight fit into a permanent logistic post's slot that measures ½ inch wide by 2⅜ inches long. The one piece bottom coupling is made of ¼ inch thick carbon steel bar stock by ⅜ inch wide by 1³⁄₁₆ inch long. The bottom end is notched out by ¼ inch deep by ⁷⁄₁₆ inch long allowing the bottom coupling to be inserted into a vertical logistic post slot securing itself behind the slot. The bottom coupling will protrude outward on the backside of each front and rear end plate but this will be recessed when placed into a permanent logistic post's slot.

The coupling's top, front and rear, when assembled are designed to be recessed into the upper portion of a permanent slot of a vertical logistic post and to withstand all upward forces as well as helps to withstand pulling forces, forward forces and rearward forces—all of which keep the upper half of the logistic track from moving. The coupling's top works in conjunction with the coupling's bottom to withstand pulling forces, forward forces and rearward forces.

The coupling's top recesses into a permanent slot of a vertical logistic post. Inside each of the two coupling's top framework is a sliding rod that moves up and down by utilizing a handle and a compression spring. When the coupling's top is recessed into a permanent vertical post's slots and the sliding rod is in the most up position the rod locks behind the slot's upper frame, keeping the frame from being pulled out. When the coupling is recessed into a slot and the sliding rod is in the most downward position the sliding rod is below the slot's upper frame; allowing the track and the coupling to be pulled away from the wall.

The coupling's bottom, front and rear, are of one solid material and are designed to be recessed into the bottom portion of a permanent slot of a vertical logistic post and will withstand all downward forces as well as helps to withstand pulling forces, forward forces and rearward forces—keeping the lower half of the logistic track from moving. The coupling's bottom works in conjunction with the coupling's top to withstand pulling forces, forward forces and rearward forces.

The coupling's bottoms recess into a permanent slot of a vertical logistic post. When the coupling bottom is recessed into a permanent vertical post's slot it lays against the bottom frame of the slot and is notched so that it wraps behind the slot's framework helping to withstand pulling and downward forces. It is solely responsible for withstanding all downward forces but works in conjunction with the coupling's top to withstand all pulling forces, forward forces and rearward forces.

Each coupling's top is assembled from three individual components incorporated into the end plate's tabs.

Each coupling's top has one rod with a hole drilled one fourth of the way down for a handle to be installed through the rod and it has one handle and one compression spring. The compression spring is slid over the rod and the rod and compression spring are then placed through each top and bottom tab's hole. A handle is then placed through the hole made in the rod and it is flared on one end so that it does not come out. The rod is now able to compress, freely, downward and upward when the handle is pulled down and then released.

The two end coupling top and bottom pairs allow the logistic track to attach itself to and lock into a logistic slot on each of the two vertical logistic posts that the logistic track ties together, at any height, while allowing the logistic track to remain flush at any point against the sidewall. The design described herein incorporates a recessed coupling that allows the logistic track to lay entirely flush against the sidewall while withstanding any extreme upward, downward, forward, rearward and pulling forces that may be caused by cargo restraint devises, forklifts or cargo itself.

Note: (1) Each coupling can be mounted with mechanical fasteners or other fasteners known to those in the trade (2) The top and lower couplings can be made in different forms such as a one piece assembly that allows one or two sliding rods to lock behind the upper and lower slot's frame at the same time and/or lock into the slot's left and right frames at the same time by using compressing springs or comparable springs or mechanism known to those in the trade with a handle designed to accommodate its actuation (3) The rod can be made of other material or design known to those in the trade (4) The top and lower coupling can be made of existing couplings covered under such U.S. Pat. Nos. 4,867,623 or 6,895,867, which patents are hereby incorporated by reference, or similar Patents covered by those in the trade (5) The coupling can be attached to a logistic track end plate that may also be centered on the logistic track and inserted into only one slot on one post in place of connecting two posts together (6) The embodiment can be utilized for double decking freight allowing it to accommodate multiple cargo beams spaced to match freight size regardless of vertical logistic post spacing.

Each Couplings Top Parts List
2-tabs ⅛ inch thick by 5/16 inch W by 7/16 inch L. Material: Carbon steel. One hole by 3/16 inch diameter, Tabs punched and bent from End Plate Material
1-Solid Rod×3/16 inch D by 1½ inch L. Material: Stainless steel. One hole located ½ inch from top, no bends.
1-Compression Spring by 3/16 inch D by ⅞ inch L Material: Wire
1-Handle×3/32 inch D by 1 inch L. Material: Carbon steel. No holes. Handle has 1 bend, e.g., a 90° bend, so that it locks on backside of rod and cannot be removed.

Each Couplings Bottom Parts List
1-Solid Block by ¼ inch thick by ⅜ inch W by 1 3/16 inch L. Material: Carbon steel.
Holes: None. Bends: None. Notch: ¼ inch deep by 7/16 inch L End Plate
1-⅛ inch thick by 2 inch W by 4⅞ L. Material: Carbon Steel. Holes: Two by ¼ inch diameter located ¼ inch from each end, centered.

Figure 14:
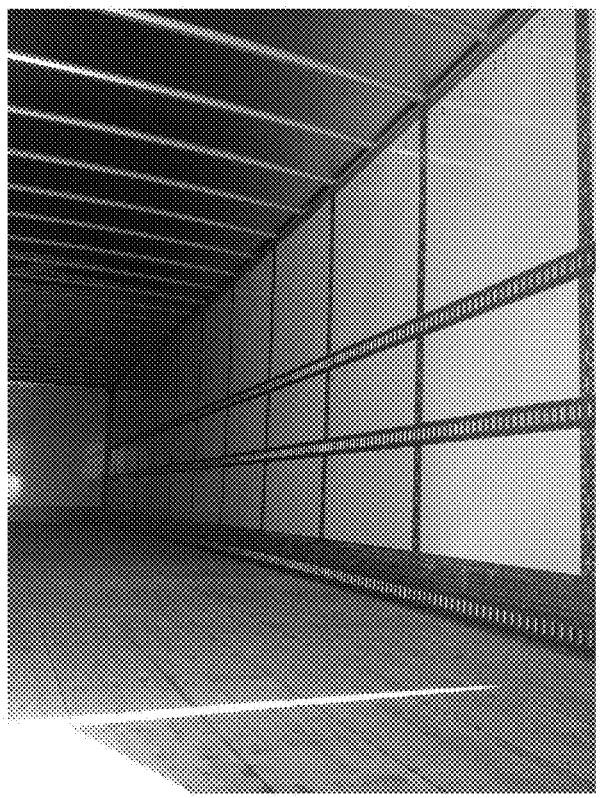
FIG. 14 denotes permanently mounted full length horizontal E series logistic track in a semi-trailer with vertical logistic posts on 50 inch centers.
Figure 15:
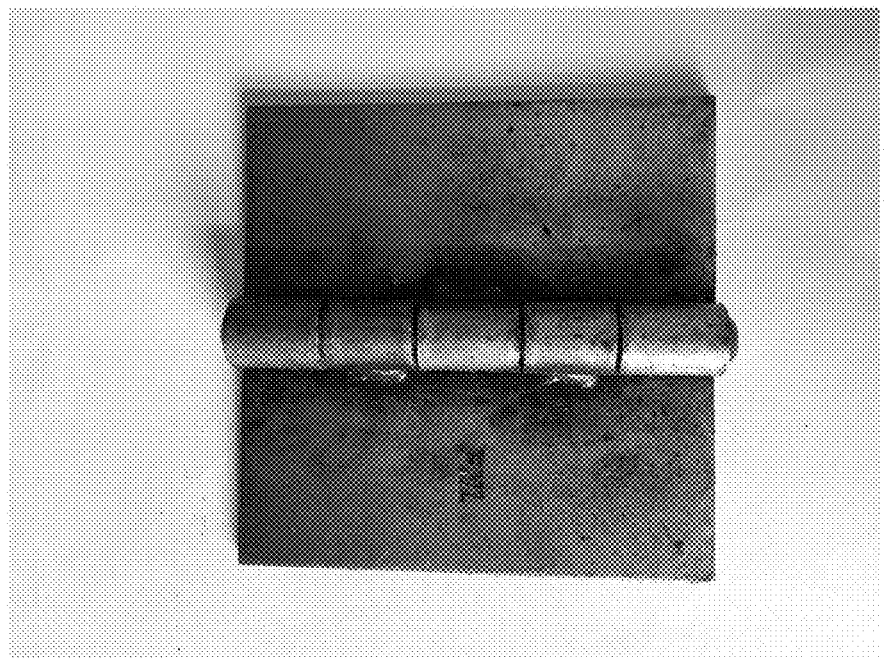
FIG. 15 identifies a plain hinge before any modifications.

Mounting Studs
2-¼ inch diameter by ⅝ inch L. Material: Threaded Steel
2-¼ inch diameter lock nut. Material: Threaded Steel Logistic Track
The logistic track is made of material called E series (FIG. 14) track or A series track and is the most commonly used horizontal logistic track on the market when securing cargo restraint devices.

Notes: (1) The length of logistic track will varying depending upon the vertical logistic post centers but the most common lengths are 24 and 50 inch (2) The front coupling can be repositioned to accommodate other vertical logistic post centers (3) A variety of different logistic track known to those in the trade can be used in place of those identified herein.

Logistic Track Parts List:
Horizontal logistic track called E series track or A series track. The face has holes, called slots, punched in a rectangle shape on two inch centers side by side that measure ½ inch wide by 2⅜ inch L. The track measures ⅛ inch thick×5 inch W (overall) by 24 inches L. The legs are ⅝ inch long and the face is 3½ inch W offset and raised ¼ inch off the legs to create the hat shape. Pre-Punched mounting holes: Two 3/16 inch diameter located on each leg on two inch centers. Material: Rolled carbon steel Notes: (1) The logistic track can vary in any shape or material that compliments specific cargo tie down ends (2) The logistic track may vary in length to accommodate any vertical logistic post centers (3) The logistic track ends may be cut on each side where the face sits on the leg which allows for the face to be bent and tapered down allowing for a sloped end whereas cargo can slide by without damage compared to a blunt end (4) Angled separate end caps that are sloped and made of any material know to those in the trade may be installed on the logistic track ends to provide for a sloped surface area so that cargo can slide by without damage compared to a blunt end.

Hinged Coupling Option

Figure 19:
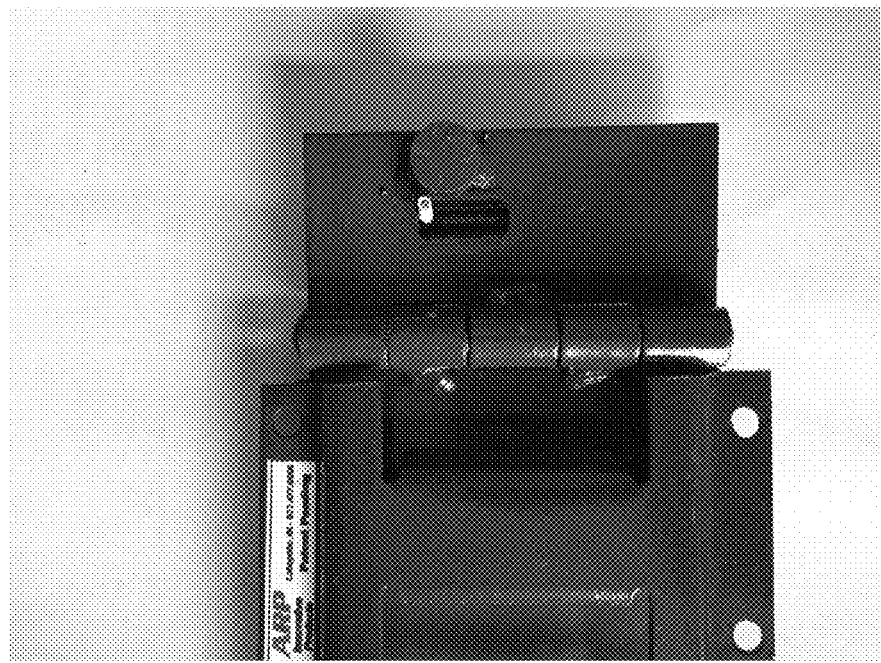
FIG. 19 represents the coupling assembly installed on the logistic track; front view.
Figure 20:
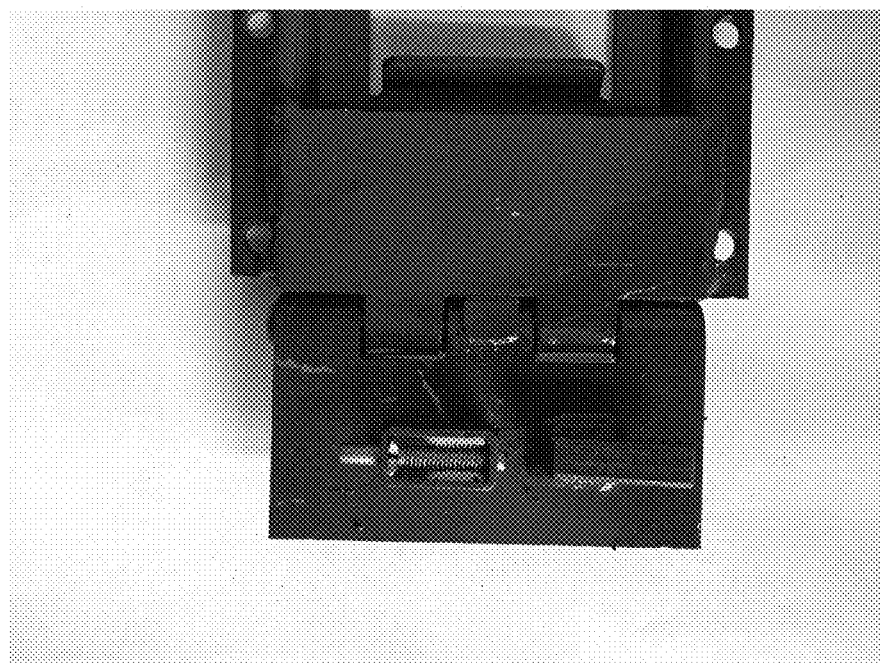
FIG. 20 represents the coupling assembly installed on the logistic track, backside view.
Figure 21:
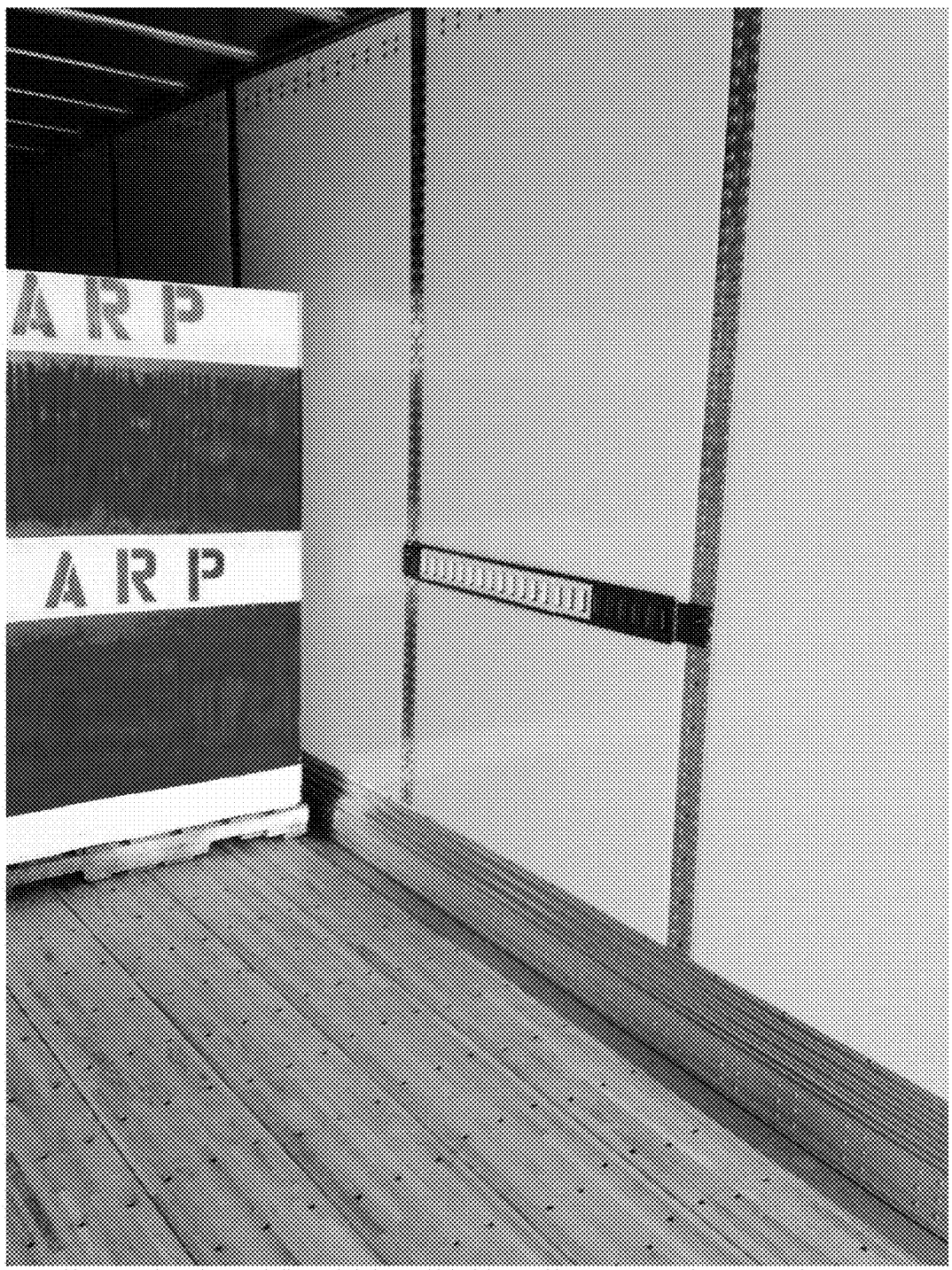
FIG. 21 shows the quick release logistic track stowed on a sidewall of a semi-trailer with 50 inch post centers while locked into one slot on two vertical logistic posts.
Figure 22:
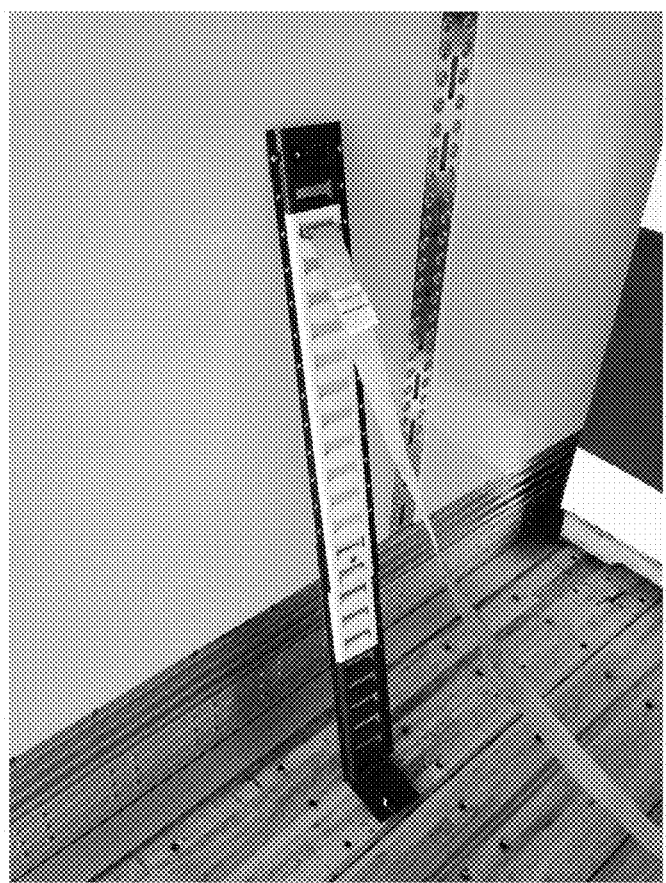
FIG. 22 depicts a strap's end fitting installed on a quick release logistic track prior to installing the quick release track between the loaded freight and sidewall.
Figure 23:
FIG. 23 denotes a passenger side view of freight that is secured with a strap and quick release logistic track where the strap was pre-loaded on the quick release logistic track prior to sliding the quick release logistic track between the loaded freight and sidewall; locking the quick release logistic track into the accessible vertical logistic posts slot and allowing the front end of the quick release logistic track to swing away from the sidewall and pull tight against the freight as the strap is tightened. Resulting in secured cargo that has no rearward movement.
Figure 24:
FIG. 24 is an unobstructed view showing how a quick release logistic track rear coupling is locked in an accessible vertical logistic post slot and pulling on a strap allows the front end of the quick release track to swing away from the sidewall.
Figure 25:
FIGS. 25-27 represents the process for inserting one end of a quick release logistic track into a vertical logistic post slot. The bottom coupling is first inserted and the coupling's top is pushed toward the slot's opening while compressing the handle to lower the coupling pin enabling the entire backside of the coupling to be recessed inside the slot. Releasing the pin allows for the coupling and quick release logistic track to remain tight and flush against the sidewall.
Figure 26:
Figure 27:
Figure 28:
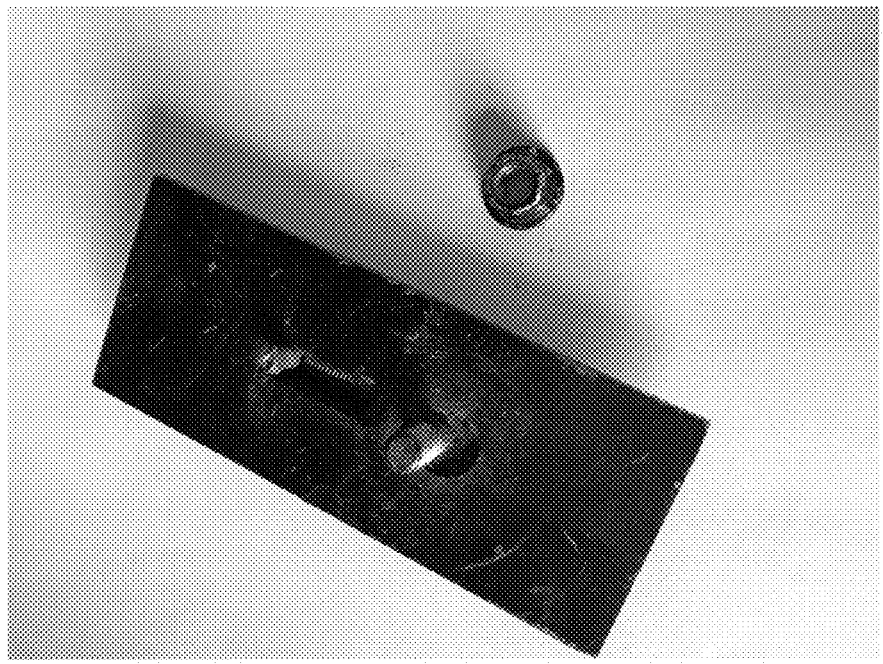
FIG. 28 shows the front side view of a hinge coupling assembled prior to installation on logistic track.

A rear coupling having a hinge device (FIG. 19) that enables the front end of a quick release logistic track to hinge away from the sidewall (FIG. 24) and brace itself directly against the freight when used in conjunction with a strap style cargo restraint device (FIG. 23). A rear hinged coupling can to be substituted for the rear fixed coupling listed herein in the description of the preferred embodiment; mirroring the same benefits except when stowing the quick release logistic track it must be locked into each slot of two vertical logistic posts or two slots on a permanently mounted horizontal logistic track to keep it stowed securely on both ends against the sidewall. The rear hinged coupling allows for a strap style cargo restraint to be installed on the invention prior to the quick release logistic track being positioned between the freight and sidewall (FIG. 22) requiring only one inch or less clearance between the freight and sidewall. When the quick release logistic track is secured into only one accessible vertical logistic post slot or permanently mounted logistic track slot aft of the freight the front end of the quick release logistic track will pull away from the sidewall when the strap is tighten butting the front end of the quick release track directly against the freight; utilizing the freight as leverage resulting in the freight being securely wrapped on the sides and most rear position. The hinge design eliminates all pulling pressure on the rear hinge coupling that is created when the strap is being tightened.

Figure 16:
FIG. 16 shows the front side view of a hinge coupling assembled prior to installation on logistic track.
Figure 17:
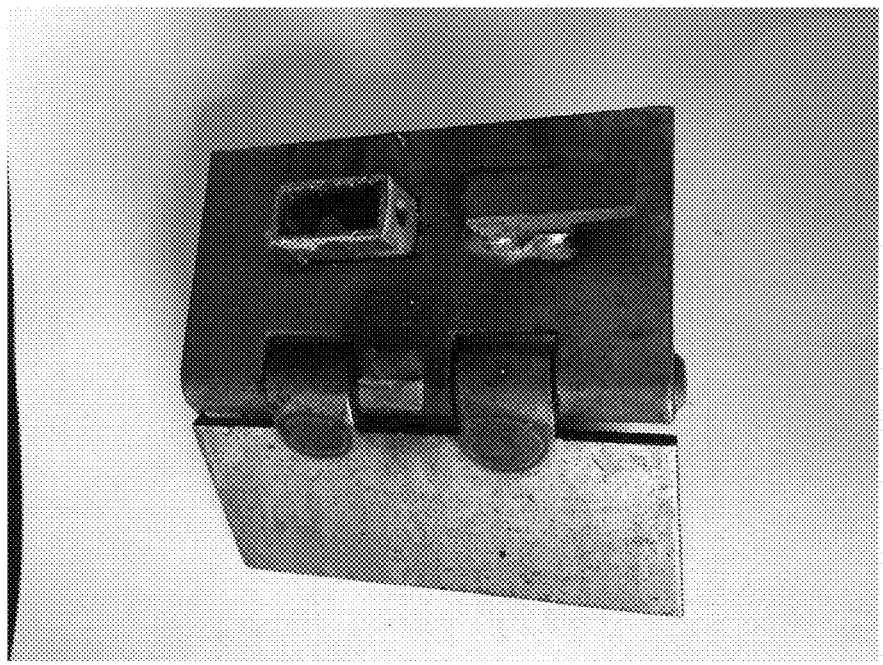
FIG. 17 is a backside view of a hinge coupling assembled with all top and bottom components prior to installing on logistic track.
Figure 18:
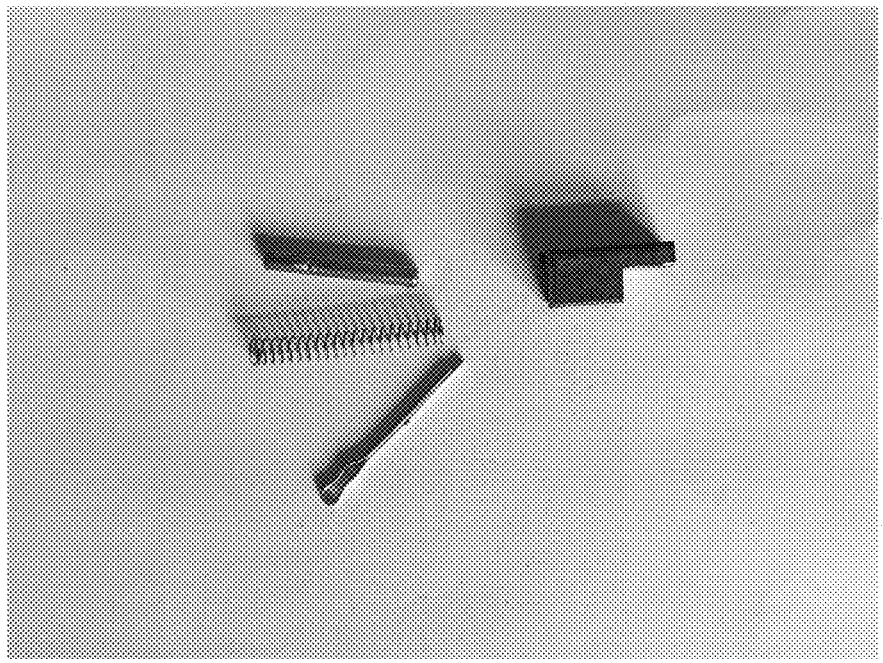
FIG. 18 lists the coupling's individual components required for the coupling assembly; compression spring, pin, handle and bottom.

A hinged coupling can to be substituted for the rear fixed coupling listed herein in the description of the preferred embodiment. The substituted embodiment is comprised of:
(1) Hinge Coupling Couplings:

Hinged coupling has a top and a bottom coupling welded to a hinge; the entire assembly (FIGS. 16 and 17) is considered the coupling. The coupling has a left and right.

The hinge coupling has a coupling side and a plain side.

Coupling side is where the top and bottom couplings are mounted.

Plain side is welded directly to the logistic track.

The hinge coupling has a top and a bottom.

The coupling's top and bottom are mounted directly on the backside of the hinge via weld.

The top coupling is permanently mounted via weld and is installed in alignment with a precut hole ½ inch wide by 1⅛ inch long located on coupling side of the hinge. The coupling's body protrudes outward on the backside of the hinge but this will be recessed when placed into a permanent logistic post's slot.

The coupling's bottom is permanently mounted via weld and is installed on the backside of hinge and located directly below the top coupling. The dimension for placement of the bottom coupling is 2⅝ inch from the top of the top coupling to the bottom of the bottom coupling which will ensure a tight fit into a permanent logistic post's slot that measures ½ inch wide by 2⅜ inches long. The one piece bottom coupling is made of ¼ inch thick carbon steel bar stock by ⅜ inch wide by 1³⁄₁₆ inch long. The bottom end is notched out by ¼ inch deep by ⁷⁄₁₆ inch long allowing the bottom coupling to be inserted into a vertical logistic post slot securing itself behind the slot. The bottom coupling will protrude outward on the backside of the end plate but this will be recessed when placed into a permanent logistic post's slot.

The top coupling is designed to be recessed into the upper portion of a permanent slot of a vertical logistic post and to withstand all upward forces as well as helps to withstand pulling forces, forward forces and rearward forces—all of which keep the upper half of the logistic track from moving. The top coupling works in conjunction with the bottom coupling to withstand pulling forces, forward forces and rearward forces.

The top coupling recesses into a permanent slot of a vertical logistic post. Inside of the top coupling's framework is a sliding rod that moves up and down by utilizing a handle and a compression spring. When the top coupling is recessed into a permanent vertical logistic post's slots and the sliding rod is in the most upward position the rod locks behind the slot's upper frame, keeping the frame from being pulled out. When the coupling is recessed into a slot and the sliding rod is in the most downward position the sliding rod is below the slot's upper frame; allowing the track and the coupling to be pulled away from the wall.

Top coupling is assembled from seven individual components and is permanently mounted to coupling side of the hinge.

Top coupling is made of two sidewalls that have no holes or bends, one top plate and one bottom plate that each has one hole and no bends, allowing a rod to slide up and down through the holes but not forward, rearward or side to side. It also has one rod with a hole drilled one fourth of the way down for a handle to be installed on the rod and it has one handle and one compression spring. The sidewall's and top and bottom plates are welded together creating a box shape with an open face. The compression spring is slid over the rod and the rod and compression spring are then placed through each top and bottom plate's hole. A handle is then placed through the hole made in the rod and it is flared on one end so that it does not come out. The rod is now able to compress, freely, downward and upward when the handle is pulled down and then released.

Note: (1) Each coupling can be mounted with mechanical fasteners or other fasteners known to those in the trade (2) The top and lower couplings can be made in different forms such as a one piece assembly that allows one or two sliding rods to lock behind the upper and lower slot's frame at the same time and/or lock into the slot's left and right frames at the same time by using compressing springs or comparable springs or mechanism known to those in the trade with a handle designed to accommodate its actuation (3) The rod can be made of other material or design known to those in the trade (4) The top and lower coupling can be made of existing couplings covered under such U.S. Pat. Nos. 4,867,623 or 6,895,867 or similar Patents covered by those in the trade (5) Hinge coupling can be made of non-corrosive material.

Hinge Parts List

1-Hinge by ⅛ inch thick by 4 inch W by 4 inch L. Material: Carbon steel. Holes: One by ½ inch W by 1⅛ inch L.

Top Coupling Parts List 2-sidewall by ⅛ inch thick by ½ inch W by ⅞ inch L. Material: Carbon steel. No holes, no bends.

1-top plate by ⅛ inch thick by ½ inch W by ½ L. Material: Carbon steel. One hole by ³⁄₁₆ inch centered, no bends.

1-bottom plate by ⅛ inch thick by ½ inch W by ½ L. Material: Carbon steel. One hole by ³⁄₁₆ inch centered, no bends.

1-Solid Rod×3/16 inch D by 1½ inch L. Material: Carbon steel. One hole located ¼ inch from top, no bends, 45° bevel at top end of rod.
1-Compression Spring by 3/16 inch D by ⅞ inch L Material: Wire.
1-Handle×3/32 inch D by ½ L. Material: Carbon steel. No holes. Front handle has 1 bend, e.g., a 90° bend, so that it does not extend as far as the insert does from the end plate. It thereby avoids interference with the logistic track insert when the insert is moved forward. Alternatively, the front handle may be made straight but short enough to avoid such interference. The rear handle has no bends.

Bottom Coupling Parts List

1-Solid bar stock by ¼ inch thick by ⅜ inch W by 1 3/16 inch L. Material: Carbon steel. Holes: None. Bends: None. Notch: ¼ inch deep by 7/16 inch L.

Swivel Coupling Option

Figure 31:
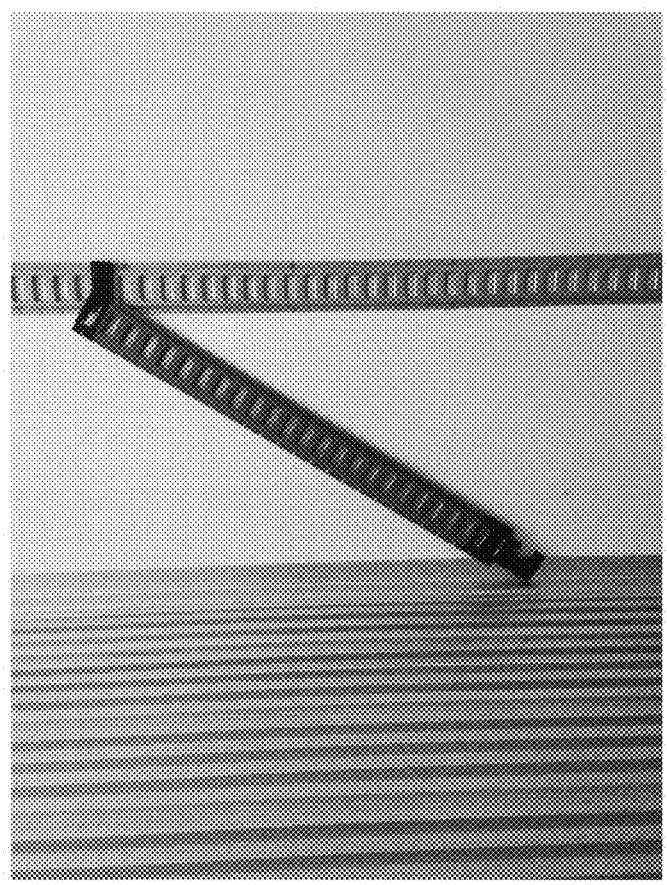
FIG. 31 depicts a quick release logistic track at floor level with its rear swivel coupling attached to a slot in permanently mounted horizontal E-series track inside a refrigerated semi-trailer with aluminum floor.
Figure 32:
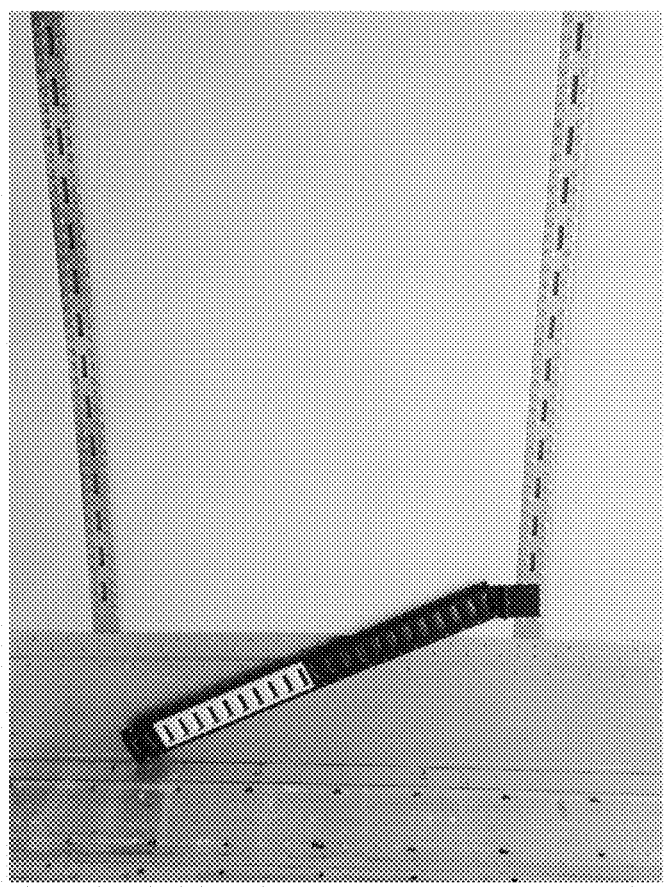
FIG. 32 shows a quick release logistic track at floor level with its rear swivel coupling attached to a slot in a vertical logistic post inside a semi-trailer with 24 inch high side scuff. The particular rear swivel coupling used in this example is also of a hinge coupling design.

A rear coupling having a swivel device that enables the front end of a quick release logistic track to drop from a horizontal position to a floor level position (FIGS. 31 and 32) allowing the securement of freight at the floor level. A rear swivel coupling can to be substituted for the rear fixed coupling listed herein in the description of the preferred embodiment; mirroring the same benefits except when stowing the quick release logistic track in the horizontal position it must be locked into each slot of two vertical logistic posts or two slots on permanently mounted horizontal logistic track.

When in use the front end of the quick release logistic track is removed from its logistic slot allowing the front end of the track to drop down to the floor level position creating logistic slot access at the floor level while the opposite and rear swivel coupling remains locked into its slot. When the front end of the quick release logistic track is at the correct position on the floor and a cargo securing device is placed directly against the freight and locked into the slot on the quick release logistic track, any pressure placed on the cargo securing device, from the freight, will be transferred to the quick release logistic track and into the rear swivel coupling that is locked into its slot and ultimately transferred directly into the sidewall as intended by the sidewall manufacturer. The quick release logistic track's ability to be located at any location on the floor between posts is unique as its position on the floor between vertical logistic posts will shorten or extend when its rear swivel coupling is locked into next highest or lowest slot on a vertical logistic post. When applying the quick release logistic track and floor level swivel coupling to E or A series permanently mounted horizontal logistic track (FIG. 31), the quick release logistic track can be relocated forward or rearward to the desired location on the floor by locking the coupling into the next appropriate slot on the permanently mounted horizontal logistic track. A quick release logistic track length can vary based upon the vertical logistic post centers or the mounting height of the permanently mounted horizontal logistic track.

Manufacturers of semi-trailers and cargo bodies often use interior sidewall protection at the floor level. Referred to as 'side scuff', it is commonly installed in heights ranging from six inches to twenty four inches and its installation requires it to be overlaid on the sidewall covering any slots (FIG. 32) that may be available on a vertical logistic post. When required to secure cargo at the floor, operators may use cargo bars with feet but very often use wooden two by fours by nailing them directly into the laminated wooden floor. This weakens the laminated floor, reduces its load rating and create holes that allow water or other elements to enter the cargo area. As equally important, and possibly more beneficial, is our invention's ability to secure cargo at the floor level in refrigerated semi-trailers and cargo bodies which traditionally use an all aluminum floor that does not allow an operator to use wooden two by fours; however operators can still use cargo bars with feet but pressure from the cargo bar with feet can soften the insulation material on the sidewall which reduces its thermal characteristics. Refrigerated semi-trailers and cargo bodies also use side scuff that commonly range from twelve inches to twenty four inches in height. Refrigerated trailers do not use logistic posts due to creating unfavorable heat sinks that reduce the refrigeration cooling unit's ability to cool efficiently. Most all cargo securing devices in refrigerated trailers are secured by using permanently mounted horizontal E or A series track located horizontally on each sidewall, either recessed into the sidewall or flush mounted to the sidewall.

Note: (1) The swivel end coupling can be incorporated into the hinged end coupling using the same principles offered by the hinge coupling option creating a hinged coupling that drops down to the floor level (2) swivel end coupling can be made of non-corrosive material.

A floor level swivel coupling can to be substituted for the rear fixed coupling listed herein in the description of the preferred embodiment. The substituted embodiment is comprised of: (1) Swivel coupling.

Figure 29:
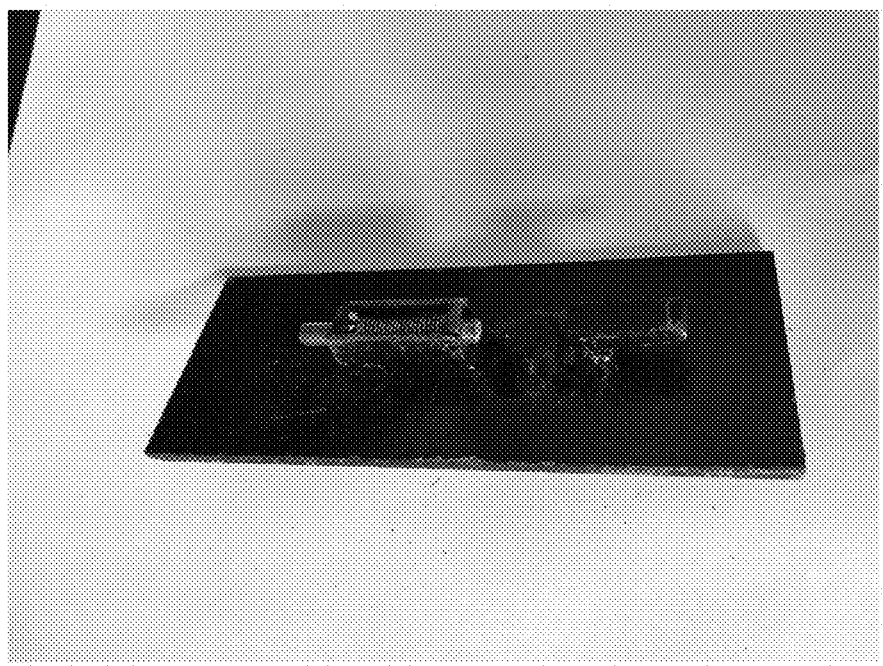
FIG. 29 is a backside view of a hinge coupling assembled with all top and bottom components prior to installing on logistic track.
Figure 30:
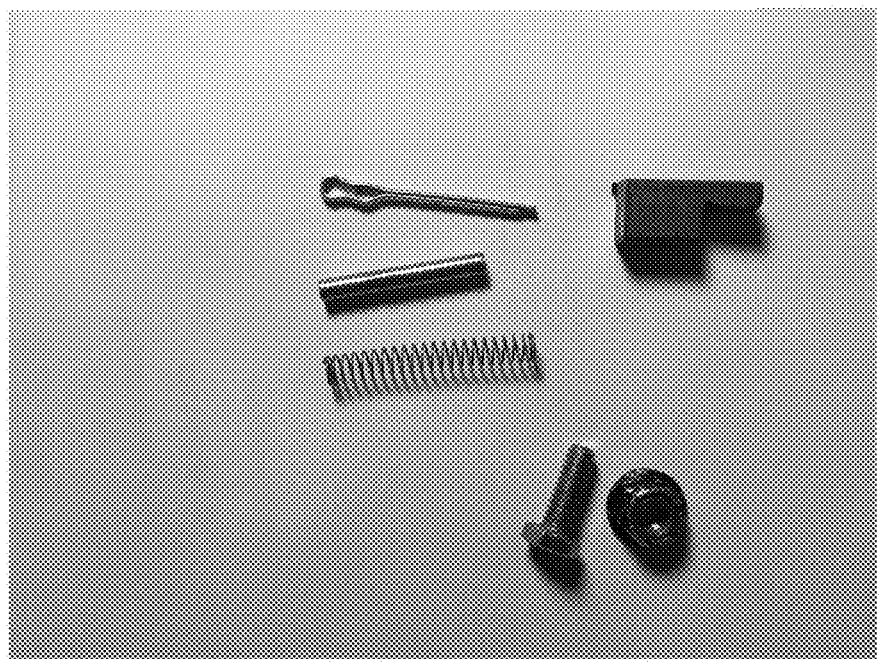
FIG. 30 lists the coupling's individual components required for the coupling assembly; compression spring, pin, handle, bottom, swivel bolt and nut.

Couplings:

Rear swivel coupling has a top and a bottom formed from or welded to an end plate; the entire assembly is considered the coupling (FIG. 29).

The coupling end plate is carbon steel by one eighth inch thick by two inches wide by four and seven eighths inch long with two ¼ inch mounting holes punched at the top and bottom and one ⅜ inch diameter hole punched approximately ⅞ inches from the top to centerline of hole.

The end plate's ¼ holes are punched approximately ¼ inch down from each end and are centered on the end plate to match mounting holes pre-punched in the logistic track. ¼ inch diameter by ⅝ inch long threaded studs are welded flush on the backside of the end plate and protrude ⅜ inch outward on the front side of the end plate so that the threaded studs can be inserted through any set of pre-punched mounting holes on the logistic track and nutted to secure the coupling assembly to the logistic track.

The end plate's ⅜ inch diameter hole located approximately ⅞ inches from the top to the centerline of hole is for the placement of a ⅜ inch diameter grade 5 bolt by ⅝ inches long that is permanently welded to the backside of the end plate and attaches to a hole drilled in the top flange of the logistic track and is secured by a ⅜ inch diameter lock nut that allows the logistic track to hinge in a downward motion. The design does not allow for the removal of upward motion of the logistic track.

The coupling's top is formed from the end plate material.

The coupling's bottom is fabricated separately and attached to the end plate.

The coupling's top and bottom are formed/fabricated and mounted on the backside of the end plate via bending and welding.

The coupling's top is formed from the end plate material via punching and bending resulting in two integral tabs positioned directly above one another and centered width ways on the end plate and that protrude on the backside of the end plate by seven sixteenths inch deep and five sixteenths inch wide with a three sixteenths inch hole punched in each tab. Each tab is three quarters of one inch apart from top to bottom—aligned directly above one another. The coupling's tabs protruded outward on the backside of the front end plate but this will be recessed when placed into a permanent logistic post's slot.

The coupling's bottom is permanently mounted via weld to the end plate and is installed on the backside of the plate directly below the coupling's top tabs. The dimension for placement of the bottom coupling is 2 11/16 inch from the top of the coupling's top tab to the bottom of the bottom coupling which will ensure a tight fit into a permanent logistic post's slot that measures ½ inch wide by 2⅜ inches long. The one piece bottom coupling is made of ¼ inch thick carbon steel bar stock by ⅜ inch wide by 1 3/16 inch long. The bottom end is notched out by ¼ inch deep by 7/16 inch long allowing the bottom coupling to be inserted into a vertical logistic post slot securing itself behind the slot. The bottom coupling will protrude outward on the backside of each front and rear end plate but this will be recessed when placed into a permanent logistic post's slot.

The coupling's top, when assembled, is designed to be recessed into the upper portion of a permanent slot of a vertical logistic post and to withstand all upward forces as well as helps to withstand pulling forces, forward forces and rearward forces—all of which keep the upper half of the logistic track from moving. The coupling's top works in conjunction with the coupling's bottom to withstand pulling forces, forward forces and rearward forces.

The coupling's top recesses into a permanent slot of a vertical logistic post. Inside of the coupling's top framework is a sliding rod that moves up and down by utilizing a handle and a compression spring. When the coupling's top is recessed into a permanent vertical logistic post's slots and the sliding rod is in the most upward position the rod locks behind the slot's upper frame, keeping the frame from being pulled out. When the coupling is recessed into a slot and the sliding rod is in the most downward position the sliding rod is below the slot's upper frame; allowing the track and the coupling to be pulled away from the wall.

The coupling's bottom is of one solid material and is designed to be recessed into the bottom portion of a permanent slot of a vertical logistic post and will withstand all downward forces as well as helps to withstand pulling forces, forward forces and rearward forces—keeping the lower half of the logistic track from moving. The coupling's bottom works in conjunction with the coupling's top to withstand pulling forces, forward forces and rearward forces.

The coupling's bottom recesses into a permanent slot of a vertical logistic post. When the coupling bottom is recessed into a permanent vertical post's slot it lays against the bottom frame of the slot and is notched so that it wraps behind the slot's framework helping to withstand pulling and downward forces. It is solely responsible for withstanding all downward forces but works in conjunction with the coupling's top to withstand all pulling forces, forward forces and rearward forces.

The coupling's top is assembled from three individual components incorporated into the end plate's tabs.

Coupling's top has one rod with a hole drilled one fourth of the way down for a handle to be installed through the rod and it has one handle and one compression spring. The compression spring is slid over the rod and the rod and compression spring are then placed through each top and bottom tab's hole. A handle is then placed through the hole made in the rod and it is flared on one end so that it does not come out. The rod is now able to compress, freely, downward and upward when the handle is pulled down and then released.

The rear swivel coupling's top and bottom allow the logistic track to attach itself to and lock into a logistic slot on each of the two vertical logistic posts that the logistic track ties together, at any height, while allowing the logistic track to remain flush at any point against the sidewall. The design described herein incorporates a recessed coupling that allows the logistic track to lay entirely flush against the sidewall while withstanding any extreme upward, downward, forward, rearward and pulling forces that may be caused by cargo restraint devises, forklifts or cargo itself.

Note: (1) Each coupling can be mounted with mechanical fasteners or other fasteners known to those in the trade (2) The top and lower couplings can be made in different forms such as a one piece assembly that allows one or two sliding rods to lock behind the upper and lower slot's frame at the same time and/or lock into the slot's left and right frames at the same time by using compressing springs or comparable springs or mechanism known to those in the trade with a handle designed to accommodate its actuation (3) The rod can be made of other material or design known to those in the trade (4) The top and lower coupling can be made of existing couplings covered under such U.S. Pat. Nos. 4,867,623 or 6,895,867 or similar Patents covered by those in the trade.

Couplings Top Parts List 2-tabs ⅛ inch thick by 5/16 inch W by 7/16 inch L. Material: Carbon steel. One hole by 3/16 inch diameter, Tabs punched and bent from End Plate Material.

1-Solid Rod×3/16 inch D by 1½ inch L. Material: Stainless steel. One hole located ½ inch from top, no bends.

1-Compression Spring by 3/16 inch D by ⅞ inch L Material: Wire.

1-Handle×3/32 inch D by 1 inch L. Material: Carbon steel. No holes. Handle has 1 bend, e.g., a 90° bend, so that it locks on backside of rod and cannot be removed.

Swivel Couplings Bottom Parts List

1-Solid Block by ¼ inch thick by ⅜ inch W by 1 3/16 inch L. Material: Carbon steel. Holes: None. Bends: None. Notch: ¼ inch deep by 7/16 inch L.

End Plate

1-⅛ inch thick by 2 inch W by 4⅞ L. Material: Carbon Steel. Holes 1: Two by ¼ inch diameter located ¼ inch from each end, centered Holes 2: One ⅜ inch diameter located ⅞ inch from top of end plate to centerline of hole.

Mounting Studs—Set 1

2-¼ inch diameter by ⅝ inch L. Material: Threaded Steel.
2-¼ Nylon Lock Nut. Material: Threaded Steel.

Mounting Studs—Set 2

1-⅜ inch diameter by ⅝ inch L. Material: Threaded Steel.
1-⅜ inch lock nut Material: Threaded Steel.

Notes: (1) Any type pin can be used in place of a bolt and nut for swivel motion (2) An attachment with hole can be attached to the series E or A track in place of drilling a hole directly into the track (3) The coupling can be made from most any material known (4) Any attachment known to those in the trade can be attached to the logistic track.

Cargo Bar with Feet Securement Attachment Option

Figure 37:
FIGS. 37 and 38 represent the process for installing a cargo bar's shaft and feet into a cargo bar with feet securement attachment that is locked into a slot on a vertical logistic post inside a semi-trailer.
Figure 38:
Figure 39:
FIG. 39 is a full width view of a cargo bar secured in cargo bar with feet securement attachments that are locked into slots on vertical logistic posts inside a semi-trailer.
Figure 40:
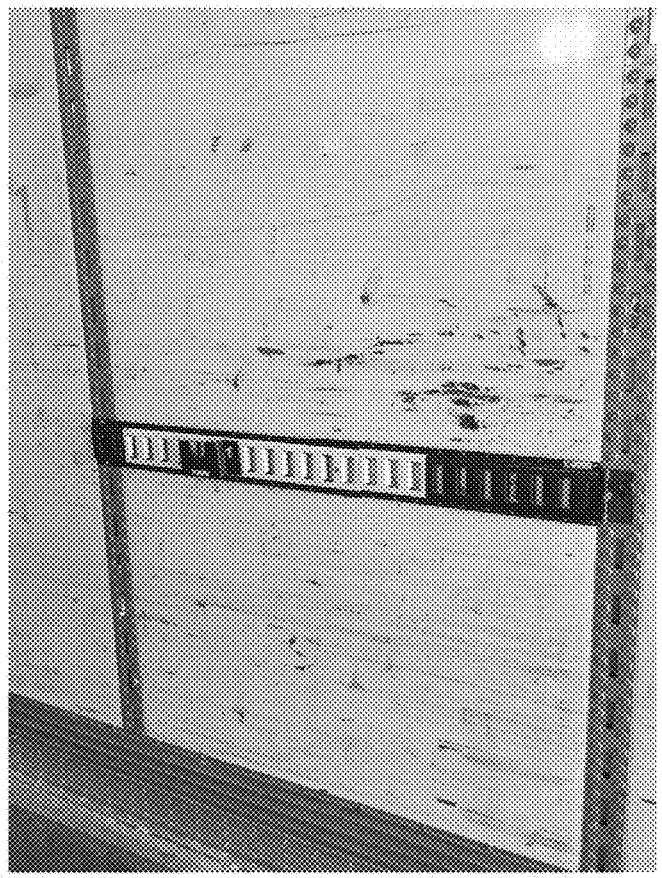
FIG. 40 shows a cargo bar with feet securement attachment locked into a slot on a quick release logistic track that is mounted to vertical logistic posts inside a semi-trailer.
Figure 41:
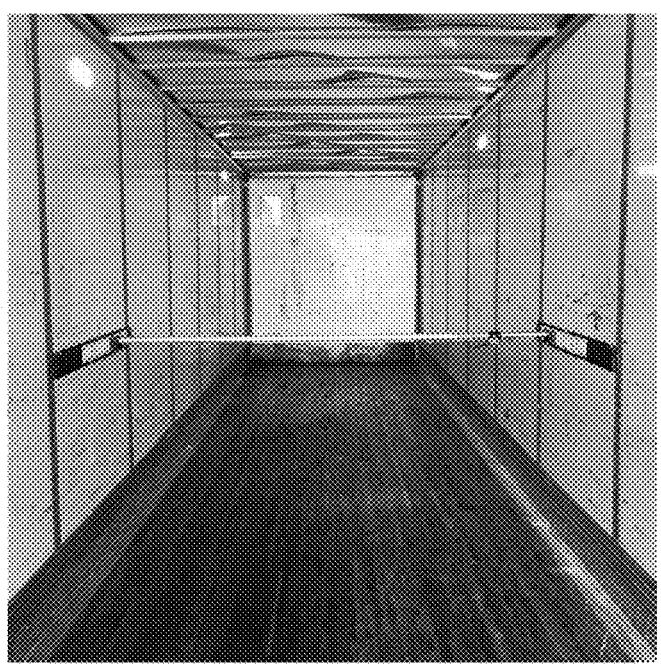
FIG. 41 is a full width view of a cargo bar secured in cargo bar with feet securement attachments that are locked into slots on quick release logistic track inside a semi-trailer.
Figure 42:
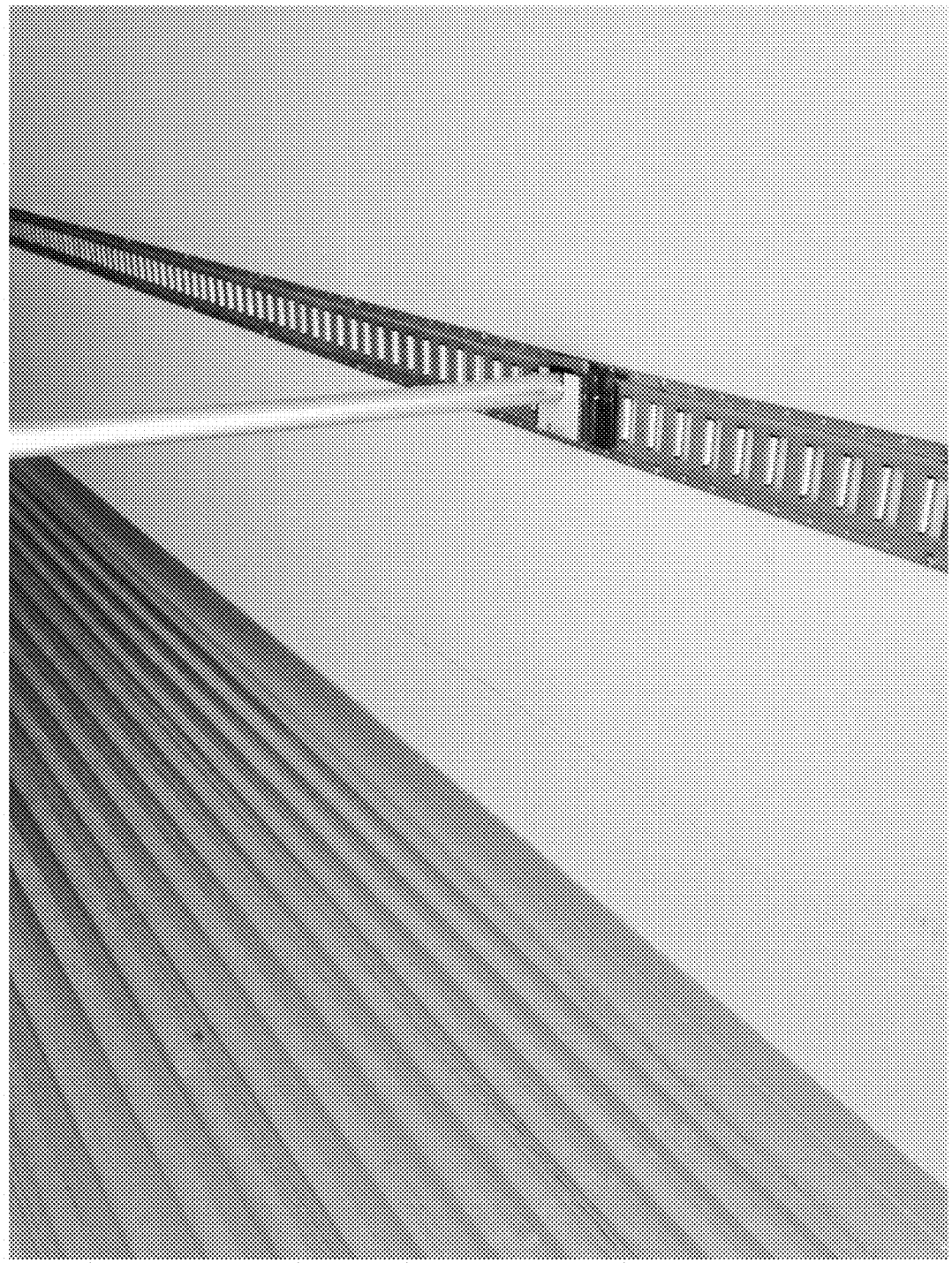
FIG. 42 depicts a passenger side view of a cargo bar secured in a cargo bar with feet securement attachment that is locked into a slot on a permanently mounted E-series horizontal logistic track inside a refrigerated semi-trailer.
Figure 43:
FIG. 43 shows a full width view of two cargo bars secured, at various heights, in cargo bar with feet securement attachments that are locked into slots on permanently mounted E-series horizontal logistic track inside a refrigerated semi-trailer.
Figure 44:
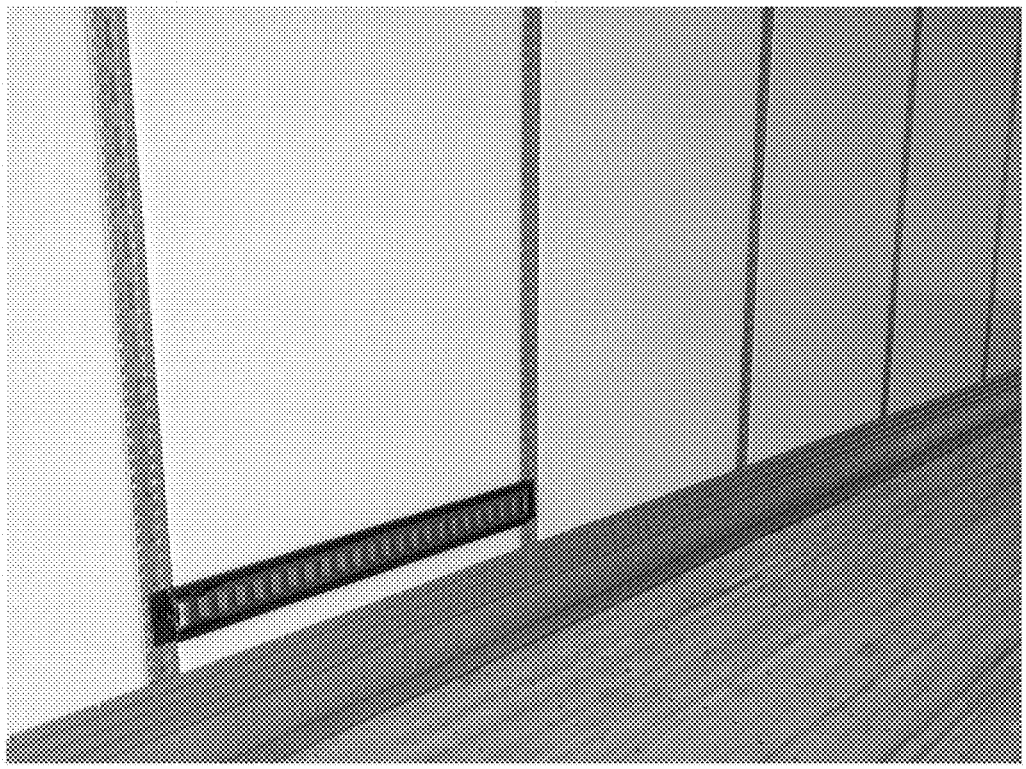
FIG. 44 is a right rear perspective view of one embodiment of a quick-release logistic track according to the present invention, with its sliding track in its retracted or stowed position, on the left interior sidewall of a semi-trailer.
Figure 45:
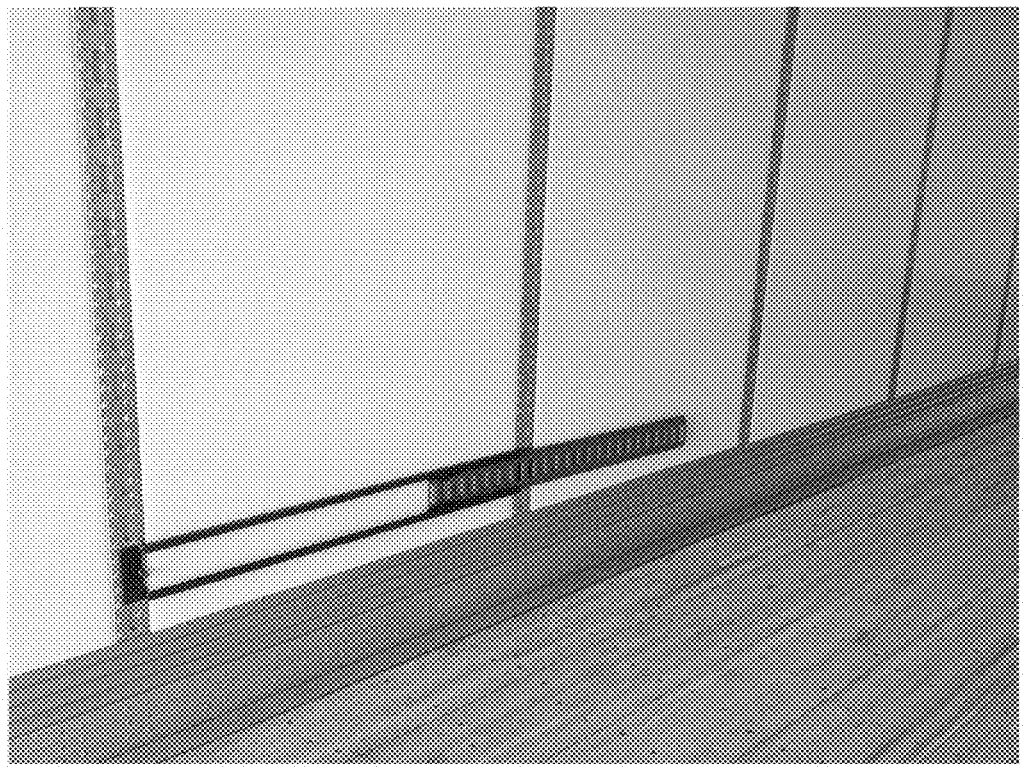
FIG. 45 shows the same quick-release logistic track with its sliding track in an extended position on the left sidewall of the semi-trailer.
Figure 46:
FIG. 46 is a rear view of the semi-trailer interior with left and right quick-release logistic tracks mounted on respective sidewalls in an extended position with a cargo bar in place.
Figure 47:
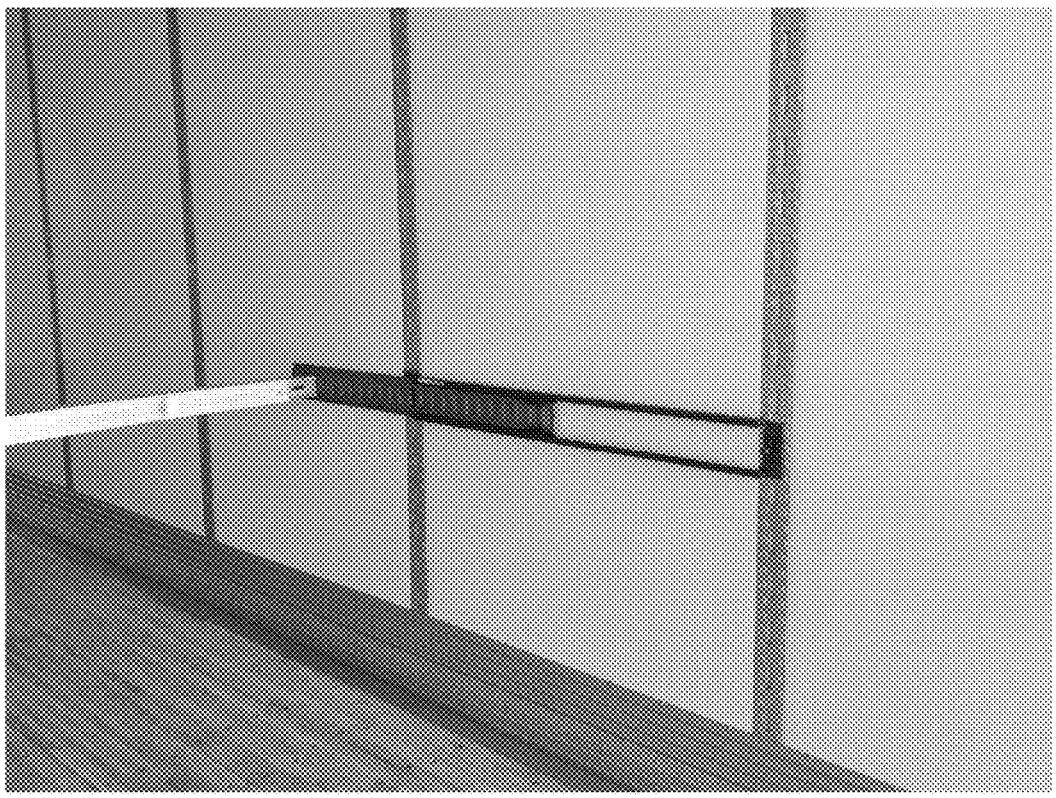
FIG. 47 is a left rear perspective view of the right quick-release logistic track of FIG. 46, with the cargo bar in place.
Figure 48:
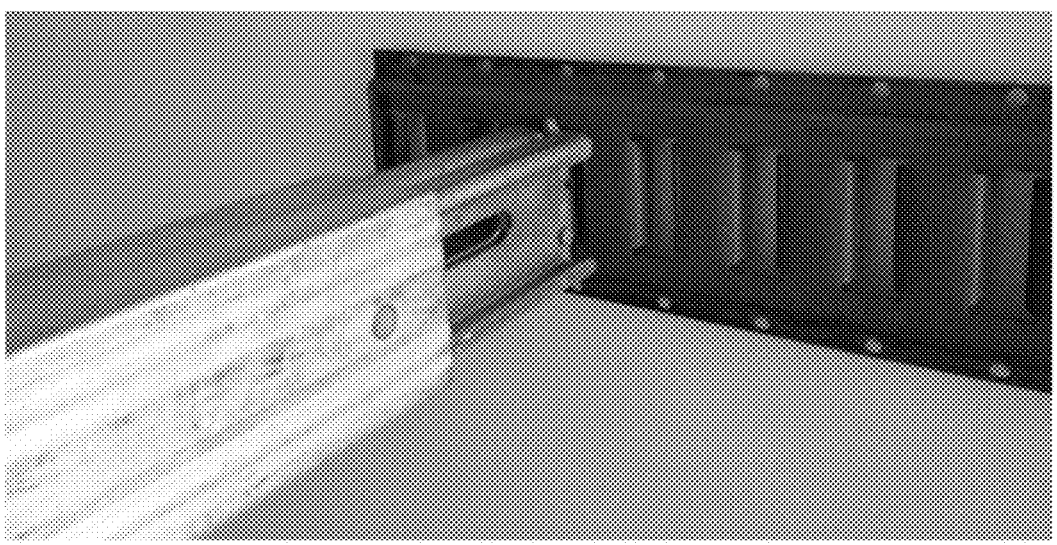
FIG. 48 shows the front portion of the extended logistic track of FIG. 47, and the cargo bar connection in more detail.
Figure 49:
FIG. 49 shows the quick-release logistic track's rear portion with rear coupling in more detail, with the sliding track retracted.
Figure 50:
FIG. 50 is a back side view of the quick-release logistic track's rear coupling.
Figure 51:
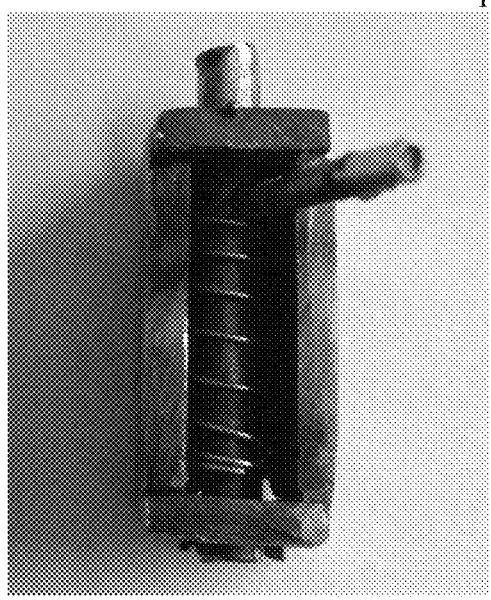
FIGS. 51 and 52 are detail views of the rear top coupling.
Figure 52:
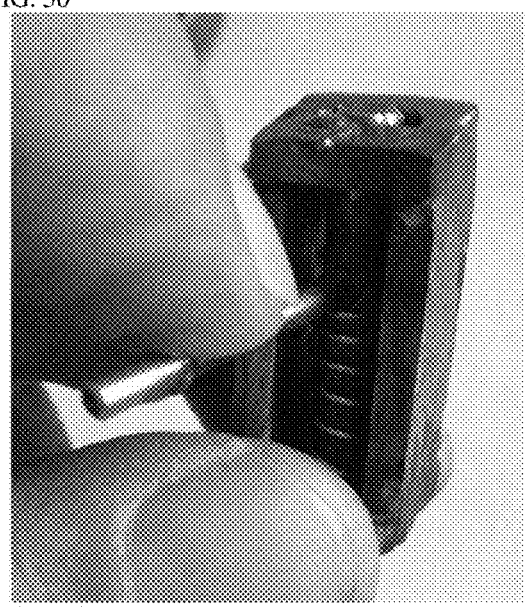
Figure 54:
FIGS. 53-56 depict the installation process.
Figure 53:
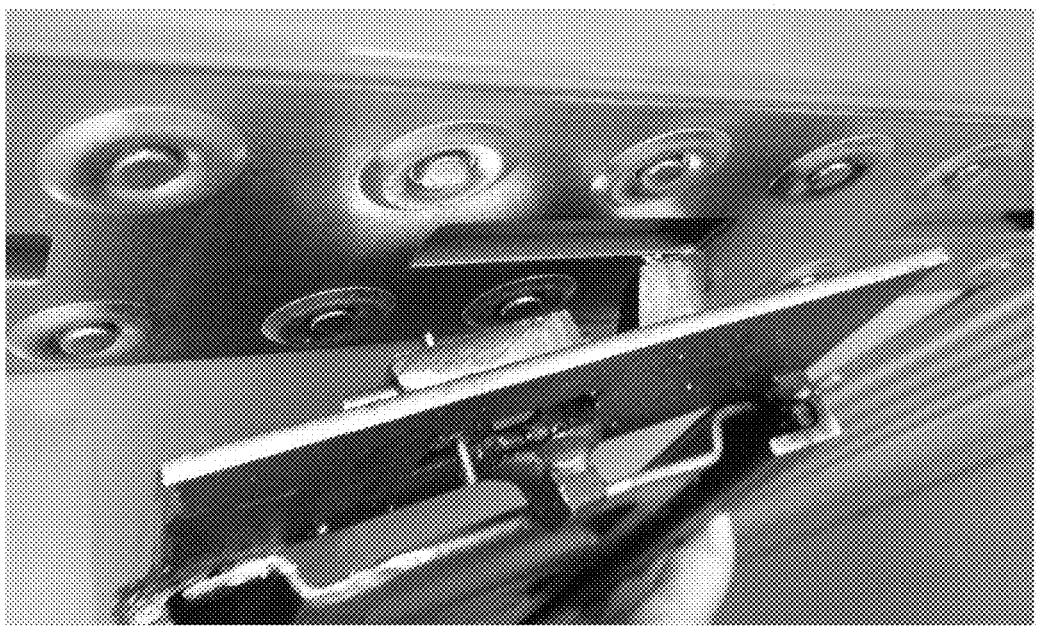
Figure 56:
Figure 55:
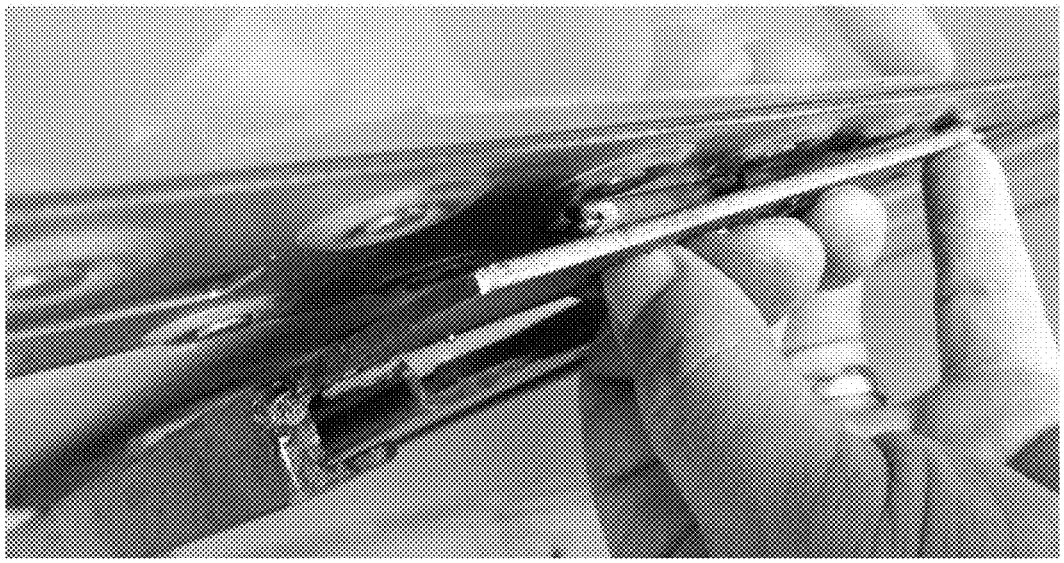
Figure 58:
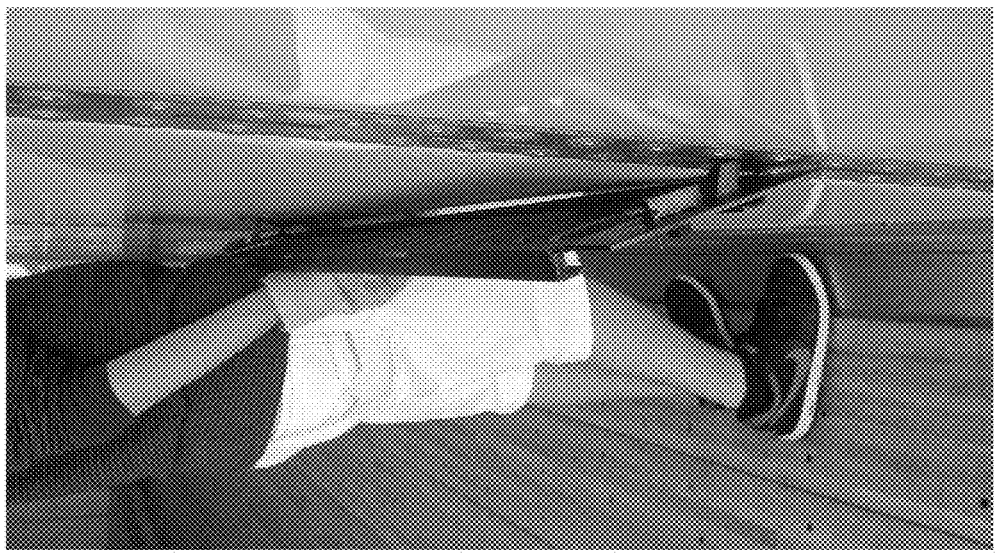
FIGS. 57-60 depict another example of the installation process.
Figure 57:
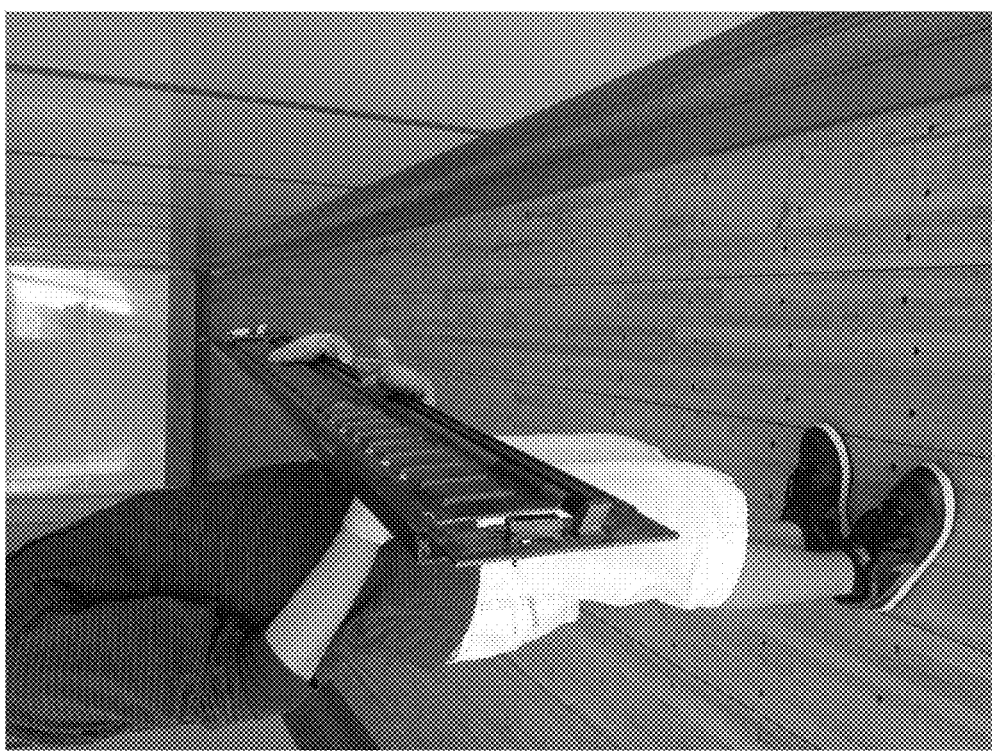
Figure 60:
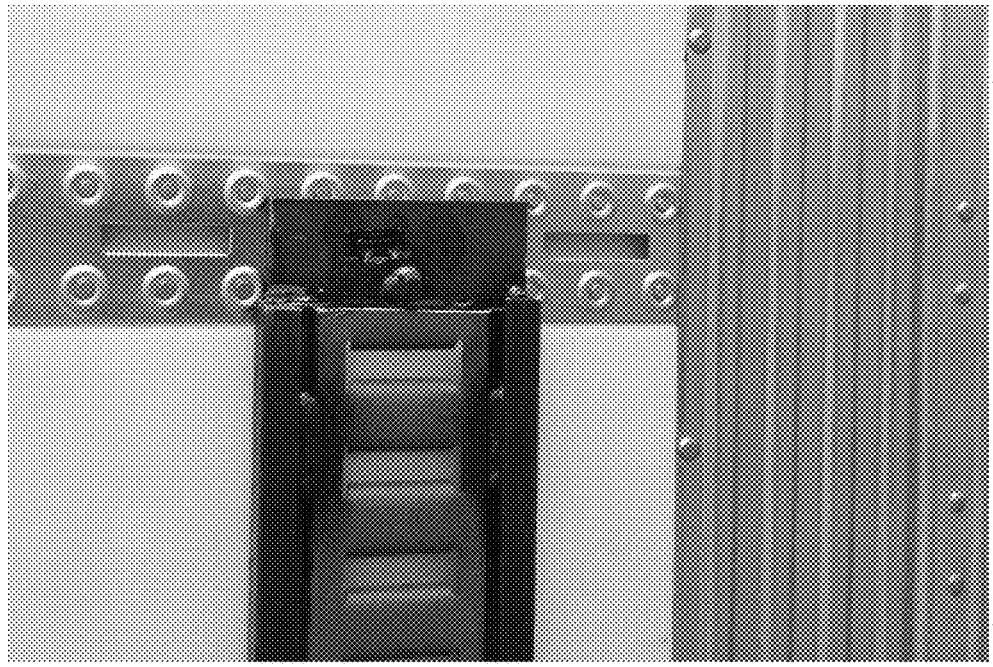
Figure 59:
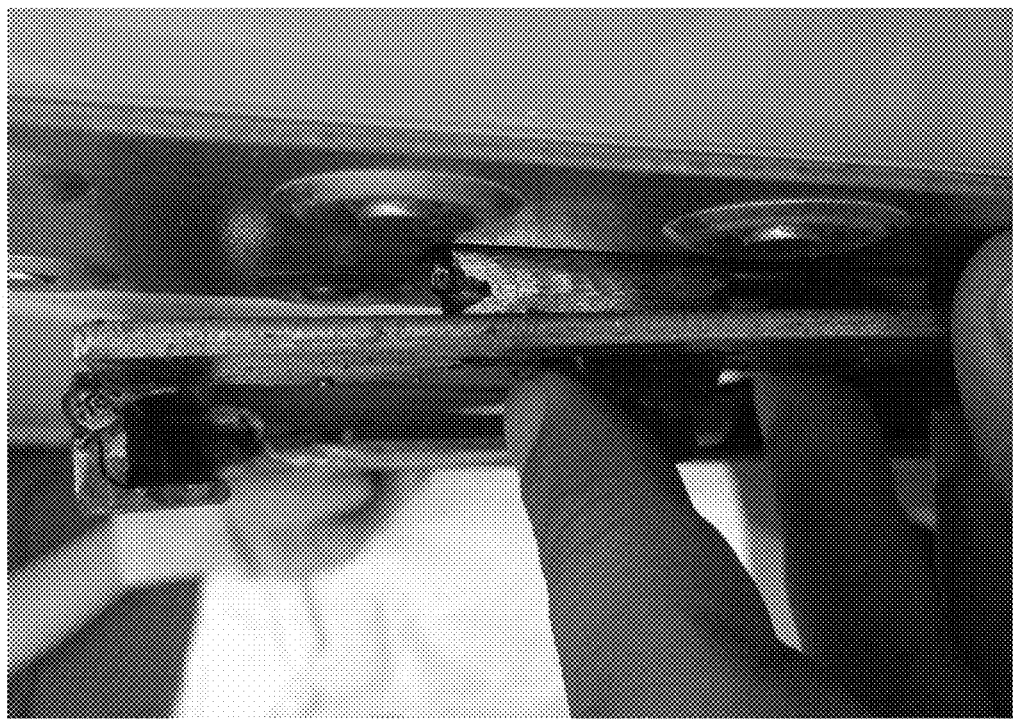
Figure 62:
FIG. 62 illustrates the front end with a frame lock bolt extending through a slot in the sliding track and into the frame lock hole.
Figure 61:
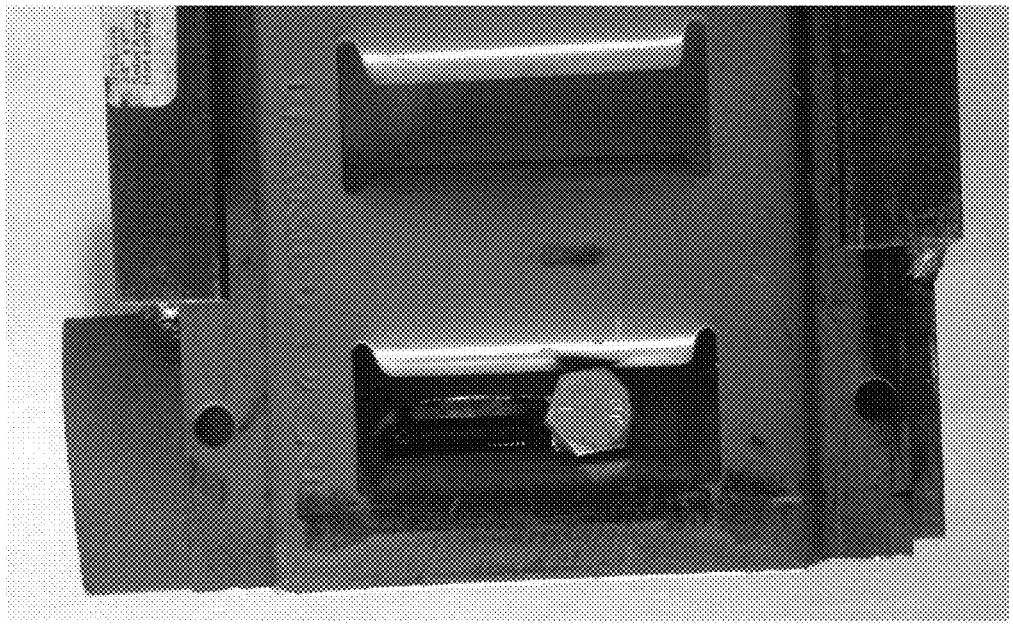
FIG. 61 illustrates the front end plate with frame lock hole.

An embodiment having a frame and coupling that creates a holder for the shaft and/or feet of an extendable Cargo Bar while working in conjunction with any logistic slot incorporated into permanently mounted logistic track (FIGS. 42 and 43), vertical logistic post (FIG. 38) or quick release logistic track (FIG. 41) inside the cargo area of semi-trailers or cargo bodies. Assembled, the coupling and frame become removable and repositionable and can be locked into any logistic slot on each sidewall of the cargo area. The assembly allows for clearance between the sidewall and frame to place the feet of the cargo bar (FIG. 37) and the frame's design allows the cargo bar's shaft to rest on it while encompassing all areas of the shaft (FIG. 38) but the top; eliminating the traditional need to apply pressure from the cargo bar to the sidewall in order to secure the cargo bar between the two sidewalls to resist any rearward or downward pressure.

Cargo Bar designs commonly include a two piece shaft with a ratchet device and internal spring or hydraulic fluid creating pressure that allows the shaft to extend inside a cargo area from sidewall to sidewall to secure freight in place. Cargo bar lengths traditionally adjust from ninety two inches to one hundred three inches in order to accommodate varying interior widths of semi-trailers and cargo bodies. Cargo bars with feet can be placed anywhere on the sidewall as a stand-alone product; without the need for logistic slots. Inherent limitations in using cargo bars with feet to secure freight include falling cargo bars when applied to flexing composite sidewalls or applying multiple cargo bars in a concentrated area with varying pressure, instability when condensation builds on sidewalls, damage to interior lining such as plywood or plastic liners due to extreme pressure applied to the cargo bar with feet in order to wedge itself between sidewalls.

Notes: (1) Components can be made of non-corrosive material (2) A strap can be incorporated to secure the cargo bar's top side to the frame (3) Dimensions may vary to accommodate various size shafts or feet.

Figure 33:
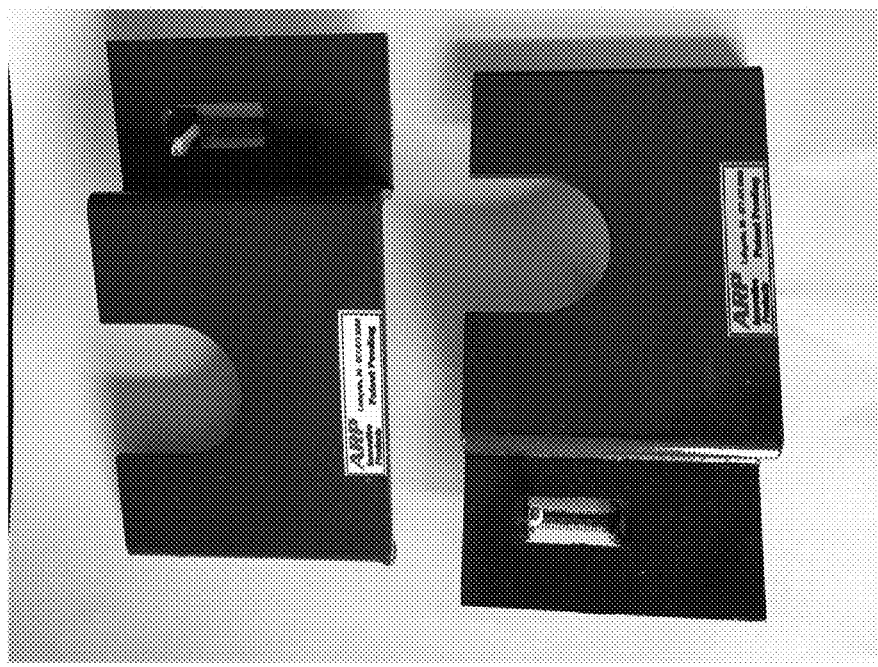
FIG. 33 shows the front side view of a pair of one piece frame holders and couplings assembled.
Figure 34:
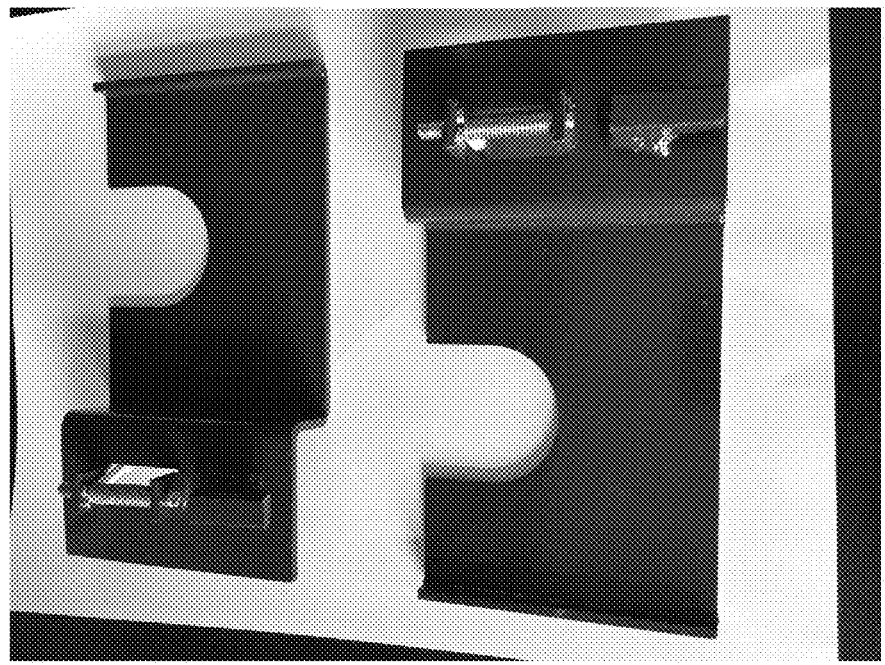
FIG. 34 shows the backside view of a pair of one piece frame holders and couplings assembled.

The embodiment of the cargo bar holder invention comprises (1) One piece fabricated frame and coupling.
Couplings:

The top coupling is an integral part of the frame and the bottom coupling is fabricated independently then attached to the one piece frame (FIG. 34). The assembly has a left and right (FIG. 33).

The fabricated one piece frame has a top and a bottom coupling formed from or welded to it; the entire assembly is considered the holder.

The fabricated one piece frame is carbon steel by one eighth inch thick by 7¼ inch wide blank size by 3¼ inch height. With two bends the overall width becomes 6¼ inches. The frame's flat coupling area is 1¾ wide with a ¾ inch bend and a 4¼ inch face that allows for the inserting of the cargo bar's rubber feet. The face also has a cut-out that is centered on the 4¼ inch face with a depth and width of 1⅝ inches from the top to accommodate the cargo bar's shaft.

Figure 35:
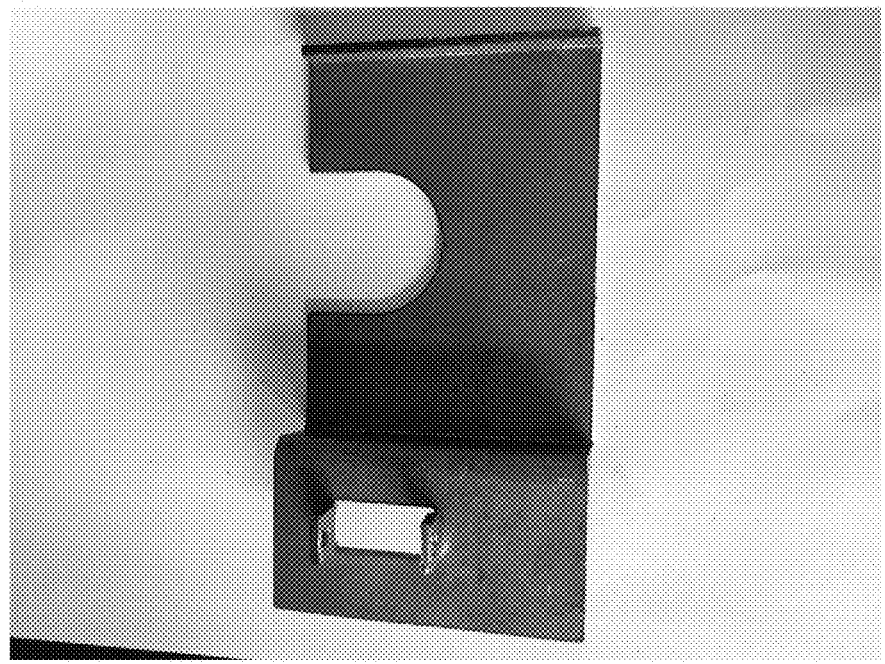
FIG. 35 denotes a backside view of a one piece frame holder and coupling prior to assembly of coupling components.
Figure 36:
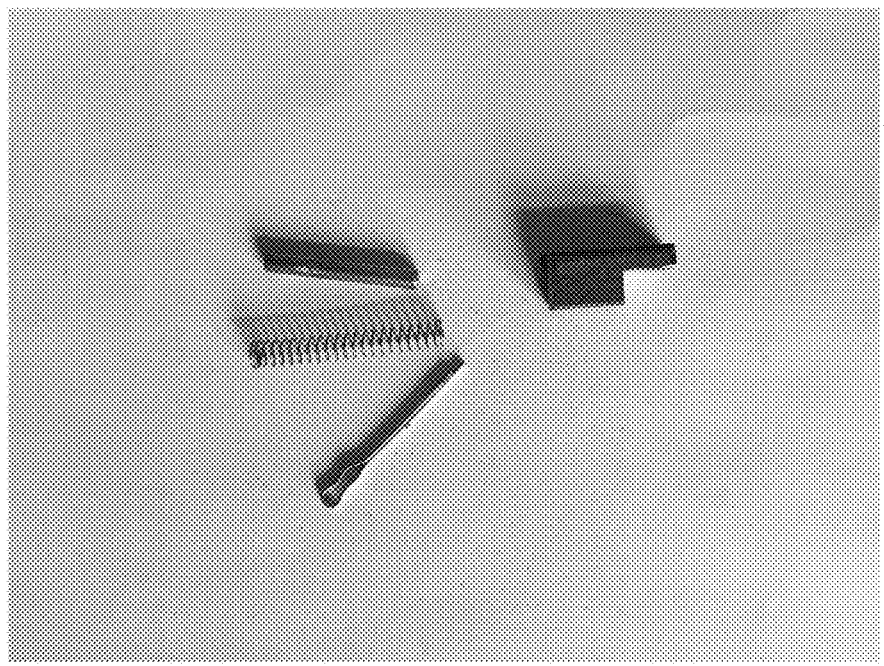
FIG. 36 lists the coupling's individual components required for the coupling assembly; compression spring, pin, handle and bottom.

The coupling's top is formed from the end plate material (FIG. 35).

The coupling's bottom is fabricated separately and attached to the end plate.

The coupling's top and bottom are formed/fabricated and mounted on the backside of the end plate via bending and welding.

The coupling's top is formed from the end plate material via punching and bending resulting in two integral tabs positioned directly above one another and centered width ways on the end plate and that protrude on the backside of the end plate by one half inch deep and one half inch wide with a three sixteenths inch hole punched in each tab.

Each tab is one inch apart from top to bottom—aligned directly above one another. The coupling's tabs protruded outward on the backside of the one piece frame but this will be recessed when placed into a permanent logistic post's slot.

The coupling's bottom is permanently mounted via weld to the end plate and is installed on the backside of the plate directly below the couplings top tabs. The dimension for placement of the bottom coupling is 2⅝ inch from the top of the coupling's top tab to the bottom of the bottom coupling which will ensure a tight fit into a permanent logistic post's slot that measures ½ inch wide by 2⅜ inches long. The one piece bottom coupling is made of ½ inch thick carbon steel bar stock by ⅜ inch wide by 1 inch long. The bottom end is notched out by ¼ inch deep by ⅜ inch long allowing the bottom coupling to be inserted into a vertical logistic post slot securing itself behind the slot. The bottom coupling will protrude outward on the backside of each front and rear end plate but this will be recessed when placed into a permanent logistic post's slot.

The coupling's top, when assembled, is designed to be recessed into the upper portion of a permanent slot of a vertical logistic post and to withstand all upward forces as well as helps to withstand pulling forces, forward forces and rearward forces—all of which keep the upper half of the logistic track from moving. The coupling's top works in conjunction with the coupling's bottom to withstand pulling forces, forward forces and rearward forces.

The coupling's top recesses into a permanent slot of a vertical logistic post or permanently mounted logistic track or a quick release logistic track. Inside of the coupling's top framework is a sliding rod that moves up and down by utilizing a handle and a compression spring. When the coupling's top is recessed into a permanent vertical post's slots and the sliding rod is in the most upward position the rod locks behind the slot's upper frame, keeping the frame from being pulled out. When the coupling is recessed into a slot and the sliding rod is in the most downward position the sliding rod is below the slot's upper frame; allowing the frame and the coupling to be pulled away from the wall.

The coupling's bottom is of one solid material and is designed to be recessed into the bottom portion of a permanent slot of a vertical logistic post and will withstand all downward forces as well as helps to withstand pulling forces, forward forces and rearward forces—keeping the frame from moving. The coupling's bottom works in conjunction with the coupling's top to withstand pulling forces, forward forces and rearward forces.

The coupling's bottom recesses into a permanent slot on a vertical logistic post. When the coupling bottom is recessed into a permanent vertical logistic post's slot it lays against the bottom frame of the slot and is notched so that it wraps behind the slot's framework helping to withstand pulling and downward forces. It is solely responsible for withstanding all downward forces but works in conjunction with the coupling's top to withstand all pulling forces, forward forces and rearward forces.

The coupling's top is assembled from three individual components incorporated into the end plate's tabs.

Coupling's top has one rod with a hole drilled one fourth of the way down for a handle to be installed through the rod and it has one handle and one compression spring. The compression spring is slid over the rod and the rod and compression spring are then placed through each top and bottom tab's hole. A handle is then placed through the hole made in the rod and it is flared on one end so that it does not come out. The rod is now able to compress, freely, downward and upward when the handle is pulled down and then released.

The coupling's top and bottom allow the assembly to attach itself to and lock into a logistic slot on any vertical logistic post or permanently mounted logistic track or quick release logistic track.

Note: (1) Each coupling can be mounted with mechanical fasteners or other fasteners known to those in the trade (2) The top and lower couplings can be made in different forms such as a one piece assembly that allows one or two sliding rods to lock behind the upper and lower slot's frame at the same time and/or lock into the slot's left and right frames at the same time by using compressing springs or comparable springs or mechanism known to those in the trade with a handle designed to accommodate its actuation (3) The rod can be made of other material or design known to those in the trade (4) The top and lower coupling can be made of existing couplings covered under such U.S. Pat. Nos. 4,867,623 or 6,895,867 or similar Patents covered by those in the trade Couplings Top Parts List 2-tabs ⅛ inch thick by 5/16 inch W by 7/16 inch L. Material: Carbon steel. One hole by 3/16 inch diameter, Tabs punched and bent from frame material.

1-Solid Rod×3/16 inch D by 1⅝ inch L. Material: Stainless steel. One hole located ½ inch from top, no bends.

1-Compression Spring by 3/16 inch D by ⅞ inch L Material: Wire.

1-Handle×3/32 inch D by 1 inch L. Material: Carbon steel. No holes. Handle has 1 bend, e.g., a 90° bend, so that it locks on backside of rod and cannot be removed.

Couplings Bottom Parts List

1-Solid Block by ¼ inch thick by ⅜ inch W by 1 inch L. Material: Carbon steel. Holes: None. Bends: None. Notch: ¼ inch deep by ⅜ inch L.

One Piece Fabricated Frame

1-Fabricated one piece frame by one eight thickness by 7¼ inch wide blank size by 3¼ inch height. With two bends the overall width becomes 6¼ inches. The frames flat coupling area is 1¾ wide with a ¾ inch bend and a 4¼ inch face that allows for the inserting of the cargo bars rubber feet. The face also has a cut-out that is centered on the 4¼ inch face with a depth and width of 1⅝ inches from the top to accommodate the cargo bar's shaft.

Frame with Extendable Track Insert

The frame with extendable track insert comprises (1) Couplings, (2) Frame, (3) Frame Lock and (4) Logistic Track Insert in one assembly.

The couplings are assembled independently then attached to each end of the frame; centered and mounted on the frame's end plates' back side.

The frame is made up of a one piece Top Channel facing downward, a one piece bottom channel facing upward and two end plates, front end plate and rear end plate, used to connect the top and bottom channels via permanent welds; allowing the frame to remain perfectly square and eliminate any movement the frame may incur after it is squared. The frame's top and bottom channels are u-shaped design and made of either fabricated or formed carbon steel that allows the legs of the logistic track insert to slide inside both channels—securing the insert from being removed from the frame without the operator's intention.

The frame's lock is permanently mounted on the frame itself and inserts into one slot on the logistic track Insert while locking into a hole on the frame's front end plate. The frame's lock secures the logistic track insert inside the frame or in any position when it is extended outside the frame. The frame's lock also transfers any push or pull forces, that are placed on the logistic track Insert, into the frame which will distribute the forces through the couplings and into the permanently mounted slot and into the sidewall. The logistic track Insert is a one piece horizontal logistic track called E series track or A series track and is made of carbon steel and is formed in a hat shape with an overall width of five inches and an overall length of forty eight inches. The face has holes, called slots, punched in a rectangle shape on two inch centers side by side. The slots allow a cargo bar or other cargo securing devices to lock its ends into the one piece horizontal logistic track's slot on each sidewall when securing cargo. The one piece horizontal logistic track can be made of varying material, can be formed into different shapes using different dimensions and can be made by using two or more short pieces that may slide together interlocking to make one. Slot centers can also be reduced further if found to be necessary but this particular track's shape, dimensions and material type described, herein, to compliment the invention are the most commonly specified and accepted in the industry and offers a low profile design that has minimal intrusion into the cargo area; reducing the track's ability to snag and damage cargo as well as reducing the track's risk of being damaged, itself, by forklift loading/unloading cargo.

Couplings:

The Frame has two end coupling pairs of the same design. One end coupling pair is considered the front and one end coupling pair is considered the rear. Each end coupling pair has a top and a bottom.

The coupling pairs are mounted on the backside of the frame's front and rear end plates in symmetrical locations via weld.

The front top coupling is permanently mounted via weld to the frame's front end plate and is installed in alignment with a precut hole ¼ inch wide by 1⅛ inch long in the end plate for the handle and is placed flush on the backside of the frame's front end plate so that the logistic track insert will slide over it and the handle without interference and so that the operator has access to maneuvering the top coupling's sliding rod handle. The coupling's body protrudes outward on the backside of the front end plate but this will be recessed when placed into a permanent logistic post's slot.

The rear top coupling is permanently mounted via weld to the frame's rear end plate and is installed in alignment with a precut hole by ¼ inch wide by 1⅛ inch long for the handle and is placed flush on the backside of frame's rear end plate. The logistic track insert will not travel over the rear top coupling due to the permanent stop located on the face of the frame's rear end plate in a centered position so that it stops the logistic track insert when it is stowed inside the frame and so that the operator has access to maneuvering the top coupling's sliding rod handle without interference from the logistic track insert. The rear top couplings body protrudes outward on the backside of frame's rear end plate but this will recessed when placed into a permanent logistic post's slot. The bottom coupling is permanently mounted via weld to each of the front and rear end plates and is installed on the backside of each plate directly below the top coupling. The dimension for placement of the bottom coupling is 2⁵⁄₁₆ inch from the top of the top coupling to the bottom of the bottom coupling which will ensure a tight fit into a permanent logistic post's slot that measures ½ inch wide by 2⅜ inches long. The one piece bottom coupling is angled at approximately forty five degrees and will protrude outward on the backside of each front and rear end plate but this will be recessed when placed into a permanent logistic post's slot.

The top couplings, front and rear, when assembled are designed to be recessed into the upper portion of a permanent slot of a vertical logistic post and to withstand all upward forces as well as helps to withstand pulling forces, forward forces and rearward forces—all of which keep the upper half of the frame from moving. The top couplings work in conjunction with the bottom couplings to withstand pulling forces, forward forces and rearward forces.

The top couplings recess into a permanent slot of a vertical logistic post. Inside each of the two top coupling's framework is a sliding rod that moves up and down by utilizing a handle and a compression spring. When the top coupling is recessed into a permanent vertical post's slots and the sliding rod is in the most up position the rod locks behind the slot's upper frame, keeping the frame from being pulled out. When the coupling is recessed into a slot and the sliding rod is in the most downward position the sliding rod is below the slot's upper frame; allowing the track and the coupling to be pulled away from the wall.

The bottom couplings, front and rear, are of one solid material and are designed to be recessed into the bottom portion of a permanent slot of a vertical logistic post and are slightly angled downward at forty five degree to withstand all downward forces as well as helps to withstand pulling forces, forward forces and rearward forces—keeping the lower half of the frame from moving. The bottom couplings work in conjunction with the top couplings to withstand pulling forces, forward forces and rearward forces.

The bottom couplings recess into a permanent slot of a vertical logistic post. When the bottom coupling is recessed into a permanent vertical post's slot it lays against the bottom frame of the slot and is angled approximately forty five degrees downward so that it slightly wraps the slot helping to withstand pulling and downward forces. It is solely responsible for withstanding all downward forces but works in conjunction with the top couplings to withstand all pulling forces, forward forces and rearward forces.

Each top coupling is assembled from seven individual components and is permanently mounted to each of the frame's end plates; referred to as front end plate and rear end plate. Each top coupling is mounted in alignment with a precut hole in the frame's front and rear end plates for the sliding rod's handle.

Each top coupling is made of two sidewalls that have no holes or bends, one top plate and one bottom plate that each has one hole and no bends, allowing a rod to slide up and down through the holes but not forward, rearward or side to side. It also has one rod with a hole drilled one fourth of the way down for a handle to be installed on the rod and it has one handle and one compression spring. The sidewalls and top and bottom plates are welded together creating a box shape with an open face. The compression spring is slid over the rod and the rod and compression spring are then placed through each top and bottom plate's hole. A handle is then placed through the hole made in the rod and it is flared on one end so that it does not come out. The rod is now able to compress, freely, downward and upward when the handle is pulled down and then released.

Each bottom coupling is made of one solid piece and is permanently mounted to the backside of each of the frame's end plates and is located directly below the top coupling two and five sixteenths of one inch from the top of the top coupling to the bottom of the bottom coupling. The two end coupling pairs allow the frame to attach itself to and lock into a logistic slot on each of the two vertical logistic posts that the frame ties together, at any height, while allowing the frame to remain flush at any point against the sidewall. The design described herein incorporates a recessed coupling that allows the frame to lay entirely flush against the sidewall while withstanding any extreme upward, downward, forward, rearward and pulling forces that may be caused by cargo restraint devises, forklifts or cargo itself and all with minimal Frame movement of no more than approximately one sixteenth of one inch in any direction.

Note: (1) Each coupling can be mounted with mechanical fasteners or other fasteners known to those in the trade (2) The top and lower couplings can be made in different forms such as a one piece assembly that allows one or two sliding rods to lock behind the upper and lower slot's frame at the same time and/or lock into the slot's left and right frames at the same time by using compressing springs or comparable springs or mechanism known to those in the trade with a handle designed to accommodate its actuation (3) The rod can be made of other material or design known to those in the trade (4) The top couplings sidewalls can be made of structural one piece channels or similar material known to those in the trade (5) The dimensions listed herein may vary according to other slot size requirements (6) The coupling assemblies can be installed on a separate mounting plate incorporating a two to three inch channel, as an example, on the frame so that one end coupling can slide to accommodate varying post widths such as 48 inch to 50 inch post centers (7) The coupling can be attached to a short frame end plate that may also be centered on the frame and inserted into only one slot on one post in place of connecting two posts together.

Each Top Coupling Parts List
2-sidewall by 1/8 inch thick by 1/2 inch W by 7/8 inch L. Material: Carbon steel. No holes, no bends
1-top plate by 1/8 inch thick by 1/2 inch W by 1/2 L. Material: Carbon steel. One hole by 3/16 inch centered, no bends
1-bottom plate by 1/8 inch thick by 1/2 inch W by 1/2 L. Material: Carbon steel. One hole by 3/16 inch centered, no bends
1-Solid Rod×3/16 inch D by 1 1/2 inch L. Material: Carbon steel. One hole located 1/4 inch from top, no bends, 45° bevel at top end of rod
1-Compression Spring by 3/16 inch D by 7/8 inch L Material: Wire
1-Handle×3/32 inch D by 1/2 L. Material: Carbon steel. No holes. Front handle has 1 bend, e.g., a 90° bend, so that it does not extend as far as the insert does from the end plate. It thereby avoids interference with the logistic track insert when the insert is moved forward. Alternatively, the front handle may be made straight but short enough to avoid such interference. The rear handle has no bends.

Each Bottom Coupling Parts List
1-Solid Block by 1/4 inch thick by 3/8 inch W by 1 3/16 inch L. Material: Carbon steel. Holes: None. Bends: None. Notch: 1/4 inch deep by 7/16 inch L Frame:
The frame assembly, with couplings and logistic track insert installed, locks into one slot on each of the two permanent logistic posts that it will tie together. The operator will determine which two posts to use based upon where the cargo is placed and at what height the cargo needs to be secured. The operator will assess the two nearest posts in front of the cargo or two nearest posts aft of the cargo that are clearly accessible. The operator will make sure the logistic track insert is stowed inside the frame in a locked position and then the operator will handle the frame in its center. The operator will first insert the bottom couplings, located on the backside of the frame's front and rear end plates on each end of the frame, into the bottom area of each post's slot. The operator will then work with only one end of the frame and pull the top coupling sliding rod's handle downward allowing the sliding rod to fall below the slot's upper frame or the operator will simply push the frame's upper half against the sidewall allowing the rod's forty five degree angle design to push the rod downward until the rod is on the backside of the slot's frame and the compression spring will push the rod upward locking behind the slot's upper frame. The operator will move to the opposite end of the frame and perform the same procedure with top coupling's sliding rod's handle, again, locking the rod behind the slot's upper frame. The frame is now secured from being pulled out of either slot and the frame is secured from moving downward, upward, rearward or forward.

The Frame has two u channels made of structural steel. These are used as guides for the legs of the logistic track insert to slide into.

The u channels are of same design and forty eight inches in length but the top u channel is faced downward and the bottom u channel is faced upward at an inside distance of five inches wide on both ends and when welded to the Frame's two end plates the frame will then permanently enclose the logistic track insert only allowing it to slide forward and rearward.

The Frame has two end plates, referred to as front end plate and rear end plate, that tie the two u channels together as well as acts as a permanent base for the top and bottom couplings to be mounted on the backside of the end plates with the top coupling's sliding rod handle being assessable through a precut hole in the end plates. Each end plate is welded flush to the backsides of the upper and lower u channels and extends two inches beyond the u channels length on each end; increasing the overall frame's length by four inches.

When assembled the Frame measures three eights overall thickness by five and one half inches overall width by fifty two inches in overall length when the u channels are attached to the end plates. The inside width from top u channel to bottom u channel is five inches. This inside dimension allows the logistic track insert to remain tight or square when stowed or extended outside the frame.

The Frame is a rectangular shape

The logistic track insert will travel only over the front top coupling and its sliding rod handle and without interference when the operator has a need to place the logistic track insert into an extended position.

The logistic track insert will again pass over the front top coupling and its sliding rod handle and without interference when the operator is finished and places the logistic track insert into its stowed position. When in a stowed position the logistic track insert will butt against the stop on the face of the rear end plate.

Notes: (1) The frame dimension in overall width, inside width, depth and length may vary according to the logistic track insert that is being utilized (2) The top and bottom channels can be made of angles, or angle iron, placed together to form a U channel or other shaped material known by those in the trade to make channels (3) Steel strap bands can be placed on the back side of the frame in order to assist the front and rear end plates in keeping the upper and lower u channels square. (3) The frame can be made at shorter lengths, for instance, five inches, with only one coupling attached to the frame's end plate which may also be centered and the coupling and frame will tie into only one slot on one post to give suitable results in certain applications.

Frame Parts List

1-Top U Channel by ⅛ inch thick by ⅛ inch inside width (⅜ inch overall width) by ½ inch returns (legs) by 48 inches L. Material: Structural carbon steel. No holes, no bends 1-Bottom U Channel by ⅛ inch thick by ⅛ inch inside width (⅜ inch overall width) by ½ inch returns by 48 inches L structural carbon steel. No holes, no bends.

1-Front End Plate by ⅛ inch thick by 2 inches W by 5½ inch L. Material: Carbon steel. Two holes, One by ⅜ inch diameter and one hole by ½ inch W by 1⅛ inch L, no bends.

1-Rear End Plate by ⅛ inch thick by 2 inches W by 5½ inch L. Material: Carbon steel. One hole by ½ inch W by 1⅛ inch L, no bends.

1-Stop ½ inch thick by ½ inch W by ½ inch L. Material: Carbon steel. No holes, no bends.

Frame Lock:

The lock consists of a pin that slides through a slot on the logistic track insert and then inserts into a hole on the frame's front end plate. Once the pin inserts into the frame's front end plate hole, it prevents the logistic track insert from moving regardless if the logistic track insert is stowed inside the frame or extended outside the frame.

Frame Lock Parts List

1-Pin by ⅜ inch diameter by ⅝ inch L. Material: Carbon steel. One hole by 3/16 inch diameter, no bends, for cable or wire.

1-Cable or wire ⅛ inch diameter and 2 inches L, for tethered attachment of the pin to the frame.

Notes: (1) The frame lock can be attached to any part of the frame's upper and lower channels or to the rear end plate (2) Frame lock can lock into or between any external mounted part or design on the frame and does not have to necessarily lock into a hole into the frame's front end plate (3) Frame lock can be designed and constructed with any material know by those in the trade to prevent the logistic track insert from moving forward or rearward (4) Frame lock can lock into any part added or existing on the logistic track insert and does not have to lock into a slot on the logistic track insert (5) A bolt may be used with a threaded hole in the front end plate to lock the logistic tract insert in position.

Logistic Track Insert

The logistic track insert is made of material called E series track or A series track and is the most commonly used horizontal logistic track on the market when securing cargo restraint devices. The logistic track insert simply slides into a specially designed frame that allows no upward or downward movement from the logistic track insert when positioned either inside or outside of the frame. The only movement of the logistic track insert is rearward or forward allowing it to travel longitudinally outside the frame and back into the frame and this movement is manually made by the operator based upon the position of the cargo. The logistic track insert can be extended outside the frame two inches to forty eight inches from the front end of the frame, extending down the sidewall while remaining parallel to the floor, toward either the nose or the rear door depending on if the cargo is being secured from the front or rear. When the desired distance is reached, next to the cargo, the frame lock is locked into a slot on the logistic track insert and into a hole in the frame's front end plate so that the logistic track insert does not move. The operator then places a cargo securing device into a slot on the logistic track insert—on each sidewall. The cargo securing device should now be two inches or less from the cargo keeping it from sliding forward or rearward based upon the position of the track. When the operator is ready to unload the cargo, the operator removes the cargo securing devise from the logistic track insert slot and removes the frame lock allowing the operator to slide the logistic track insert back into the frame, entirely, butting against the permanent stop on the rear frame end plate. The operator will then lock the frame lock into a slot on the logistic track insert and into the frame's front end plate; stowing it in a locked position safely inside the frame. The logistic track insert will remain stowed inside the frame until it is needed again.

Notes: (1) Longer lengths of logistic track insert can be substituted (2) A variety of different logistic track inserts known to those in the trade can be used in place of those identified herein.

Logistic Track Insert Parts List:

Horizontal logistic track called E series track or A series track. The face has holes, called slots, punched in a rectangle shape on two inch centers side by side that measure ½ inch wide by 2⅜ inch L. The track measures ⅛ inch thick×5 inch W (overall) by 48 inches L. The legs are ⅝ inch long and the face is 3½ inch W offset and raised ¼ inch off the legs to create the hat shape. Material: Rolled carbon steel Notes: (1) The logistic track insert can very in any shape or material that compliments specific cargo tie down ends or frame (2) The logistic track insert can be installed on any size frame and may vary in length to accommodate (3) The logistic track insert ends may be cut on each side where the face sits on the leg which allows for the face to be bent and tapered down allowing for a sloped end whereas cargo can slide by without damage compared to a blunt end (4) Angled separate end caps that are sloped and made of any material know to those in the trade may be installed on the logistic track insert ends to provide for a sloped surface area so that cargo can slide by without damage compared to a blunt end.

The invention described herein can be used with multiple types of equipment or in many other applications. Such equipment includes, but not limited to, flatbed or drop frame platform trailers whereas a different type coupling may be attached to the frame or its end plates in order to accommodate one or more stake pockets allowing the logistic track insert to extend to cargo at floor level or other heights depending upon the height of the coupling that inserts into the stake pocket helping to secure freight from moving rearward or forward. The invention's coupling installed on a fixed logistic track section or frame with an extendable logistic track insert and that attaches two or more vertical logistic posts together may be used for double decking purposes so that if post spacing does not allow for three or more closely spaced cargo bars the invention will do so in place of the operator using plywood to cover the greater distance when post spacing is not adequate to accommodate a particular cargo or cargo skid dimension. A slide mechanism can be installed directly onto or made a part of a section or logistic track so that the coupling invention or other couplings known to those in the trade slide in place of a frame where the logistic track insert slides and the frame is fixed.

Various embodiments of logistic track in accordance with the present invention have been described herein, and they are regarded as examples embodying a number of novel aspects of the invention including but not limited to the following:

1. A horizontal or vertical logistic track or post attached to coupling disclosed herein or of other design known to those in the trade that allows a design for a permanently mounted logistic track or logistic post to become portable and used in conjunction with other logistic posts, logistic tracks or apparatus that incorporates its slots or other slots directly placed into a wall.
2. A coupling assembly that utilizes a logistic track's pre-punched mounting holes on predefined centers, e.g., two inch centers, enabling a coupling to be relocated and re-fastened to accommodate varying logistic post centers.
3. A horizontal or vertical logistic track or post or other embodiment attached to coupling disclosed herein or of other design know to those in the trade that a can be placed between freight and sidewall after freight is loaded allowing a logistic slot to be within a small distance, e.g., two inches, aft of freight at any location and allowing the embodiment's coupling to lock into a logistic slot aft of the freight's most rear location.
4. Coupling installation is not limited to installation on a secondary frame for a logistic track insert that allows the insert to extend past the frame. The coupling can be permanently installed directly to a section or full length logistic track offering select features without the extendable option.
5. Coupling installation is not limited to direct installation to a secondary frame, section of logistic track or full length logistic track and can be installed directly to any other device that offers benefits of securing cargo or similar or any device deemed to be improved by attaching itself to the coupling.
6. A coupling device and frame designed for a logistic track insert that creates a sidewall flush-mounted logistic track that is extendable in one preferred embodiment and allows for continuous cargo tie down points, working in conjunction with a vertical slotted single post or two or more posts or other slots, that can be placed at any location in the cargo area of a semi-trailer and other cargo transporting vehicles enabling cargo restraint devices to be placed directly against cargo regardless of where the cargo is positioned.
    a. Frame assembly allowing for sliding logistic track insert.
    b. One piece formed, fabricated or extruded track with established logistic slots.
    c. Coupling device ends that are recessed when frame is mounted allowing frame to remain flush against a wall.
    d. Lock Mechanism designed to lock a logistic track insert into place regardless of position inside or outside of frame.
    e. Logistic track insert's slot is identified as E series track, A series track or other commonly shaped or named slots used for securing cargo tie down devices.
    f. Generally made of carbon steel but can be made from almost any type of material known to those in the trade that can withstand the abuse by forklift loading/unloading and pressures from holding cargo in place.
    g. Shape of invention described hereto is not limited by scope of current shape or dimensions that currently allows for minimal intrusion into cargo area and ability to deflect cargo being loaded/unloaded.
    h. End attachment assemblies are not limited to shape and dimensions of ones described herein.
7. A frame designed for logistic track insert that creates a sidewall flush mounted logistic track that that is extendable, sliding in and out utilizing a frame, and allows for continuous cargo tie down points, working in conjunction with a vertical slotted single post or two or more posts or other slots, that can be placed at any location in the cargo area of a semi-trailer and other cargo transporting vehicles enabling cargo restraint devices to be placed directly against cargo regardless of where the cargo is positioned.

a. The frame's design listed herein can be made of two or more lengths tied together to make one obtaining similar results.
b. The frame's channels listed herein can be fabricated or formed by one or more pieces and of a different one or two piece design allowing a variety of logistic track inserts to perform with similar results.
c. The frame is not limited to a design that allows for a logistic track insert that slides or extends. The logistic track insert can remain permanently fixed.
d. The frame can also be designed to include the characteristics of a logistic track and can be permanently fixed to or as part of the design to the frame without using a logistic track insert or comparable.

8. Coupling that is recessed entirely inside the permanently mounted slot that it locks into allowing for any device, the coupling is attached to, to remain flush against the wall at any given point.

9. Coupling that is recessed entirely inside the permanently mounted slot and has a framework designed to collectively withstand pulling forces, upward forces, downward forces, rearward forces and forward forces and with no movement or minimal movement when attached to a device.
   a. The coupling herein has a design that can be reconfigured or repositioned giving the same results of minimal movement but the current design performs efficiently.

10. Coupling that utilizes a rod with spring action that adjusts upward and or downward behind the slot's upper and or lower wall eliminating the ability to remove the coupling with a pulling action without manually unlocking said coupling. The rod with upward and downward spring action works in conjunction with a fixed attachment that is angled in the opposite direction (upward or downward); parallel to the rod with spring action.
   a. The coupling described herein can be made of similar designs such as incorporating a rod that can lock behind the slot's upper and lower wall and/or lock behind the slot's left and right walls
   b. The coupling described herein can be made with other materials in place of the rod and can be made with manual action and locking designs in place of spring action or with other material known to those in the trade that give the same effect as spring action but the current design works efficiently.

11. Coupling that utilizes a rod or similar design that has its end(s) angled in a manner that allows it to compress downward or upward when forced against a surface and spring upward or downward when force is no longer applied allowing the rod slide behind a solid surface when force is applied locking it in and keeping it from being removed without manually decompressing a spring or similar.

12. Coupling that secures to a frame with extendable logistic track or secures to a section of logistic track or posts and ties together two or more posts anywhere in the cargo area and at any height and is used for double decking purposes allowing the operator to utilize two or more cargo bars on the same section of portable track in order to accommodate any cargo or cargo skid size eliminating the need for plywood or like to cover the unfavorable greater distance of the permanently mounted logistic posts.

13. Coupling device that attaches to and incorporates a vertical logistic post or vertical E/A series track or like and as an assembly attached itself to a horizontal E/A series track creating a portable and repositionable vertical post.

14. Coupling that can secure a logistic track, frame, member or similar on a sidewall of a semi-trailer or cargo body or similar allowing for one end to remain secured permanently or temporarily to the sidewall via a slot in a vertical logistic post or e/a series horizontal/vertical track or plain surface enabling the opposite end of the logistic track, frame, member or similar to hinge away from the sidewall.

15. Coupling that can secure a logistic track, frame, member or similar on a sidewall of a semi-trailer or cargo body or similar allowing for one end to remain secured permanently or temporarily to the sidewall via a slot in a vertical logistic post or e/a series horizontal/vertical track or plain surface enabling the opposite end of the logistic track, frame, member or similar to hinge away from the sidewall and utilize freight or similar as leverage to pull a securing device taunt.

16. Coupling that can secure a logistic track, frame, member or similar on a sidewall of a semi-trailer or cargo body or similar with the ability for one end to be repositioned to the floor level while one end remains secured to the sidewall via a slot in a vertical logistic post or e/a series horizontal track or similar providing the ability to secure cargo securing devices such as straps, cargo bars with feet, cargo beams, wooden two by fours or similar at the floor level 17. Coupling that can secure a logistic track, frame, member or similar on a sidewall of a semi-trailer or cargo body or similar with the ability to be repositioned throughout the sidewall via a quick release coupling or similar coupling known to those in the trade and the ability for one end to be repositioned to the floor level while one end remains secured to the sidewall via a slot in a vertical logistic post or e/a series horizontal track or similar or plain surface providing the ability to secure cargo securing devices such as straps, cargo bars with feet, cargo beams, wooden two by fours or similar at the floor level.

18. Coupling that can secure a logistic track, frame, member or similar on a sidewall of a semi-trailer or cargo body or similar with the ability for one end to be repositioned to the floor level while one end remains secured to the sidewall via a slot in a vertical logistic post and utilizing the different heights of the vertical logistic post slots to move the floor level end forward or rearward on the floor between vertical logistic posts providing the ability to secure cargo securing devices such as straps, cargo bars with feet, cargo beams, wooden two by fours or similar at the floor level.

19. Coupling that can secure a logistic track, frame, member or similar on a sidewall of a semi-trailer or cargo body or similar with the ability for one end to be repositioned to the floor level while one end remains secured to the sidewall via a slot in a horizontal e/a series logistic track and utilizing the different position slots on the horizontal logistic track in order to move the floor level end forward or rearward on the floor providing the ability to secure cargo securing devices such as straps, cargo bars with feet, cargo beams, wooden two by fours or similar at the floor level.

20. A securing attachment created to secure cargo bars with feet or similar against the wall or other areas of, but not limited to, semi-trailers or cargo bodies should a cargo bar with feet become loose against the wall.

21. A securing attachment created to attach permanently, mechanically or by way of any known coupling to any track or posts where a cargo bar with feet or similar may be utilized to secure cargo or similar.

22. A securing attachment created to secure cargo bars with feet or similar against the wall or other areas of, but not limited to, semi-trailers or cargo bodies, while allowing the feet to remain against the sidewall as intended, should a cargo bar with feet become loose against the wall.

23. A securing attachment created to secure cargo bars with feet or similar against the wall or other areas of, but not limited to, semi-trailers or cargo bodies while its inherent or slightly modified design can hold in place other cargo securing devices such as wooden two by fours or comparable preventing any downward to rearward movement allowing such cargo securing devices to be utilized with same attachment.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed:

1. A quick-release, horizontal logistic track for coupling to a wall-mounted, slotted vertical logistic post in the cargo area of a cargo transport vehicle, comprising:

a horizontally extending slotted track having a front side, a back side and a plurality of slots spaced apart along its length, said slotted track designed for backside mounting to a wall in the cargo area; and a quick-release coupler attached to said slotted track adjacent an end thereof and designed to releasably engage one or more slots in said vertical logistic post, said coupler including first and second projections, at least one being spring-biased, designed to fit through a slot in said post and extend within said post behind a wall surface adjacent said slot.

2. A coupling assembly designed to utilize a logistic track's pre-punched mounting holes on predefined centers enabling a coupling to be relocated and re-fastened to accommodate varying logistic post centers.

3. The quick-release, horizontal logistic track of claim 1, wherein said quick-release coupler enables flush mounting of said logistic track against the wall of the cargo area.

4. The quick-release, horizontal logistic track of claim 1, wherein said coupling can accommodate a hinged form that allows one end of said track to hinge away from the wall in a parallel manner while the opposite end of the track remains anchored to a vertical logistic post slot on the same wall.

5. The quick-release, horizontal logistic track of claim 1, further comprising a securing attachment, secured by one slot on the track, to accommodate rubber feet of a cargo bar that does not independently require the use of slots of a track or vertical logistic post in order to secure freight.

\* \* \* \* \*